US005801940A

United States Patent [19]
Russ et al.

[11] Patent Number: 5,801,940
[45] Date of Patent: *Sep. 1, 1998

[54] FAULT-TOLERANT HVAC SYSTEM

[75] Inventors: Robert M. Russ, Los Altos Hills, Calif.; William W. Bassett, Wheaton, Ill.; Charles A. Glorioso, Castro Valley, Calif.; Nir Merry, Mountain View, Calif.; Larry A. Lincoln, Milpitas, Calif.

[73] Assignee: Gas Research Institute, Chicago, Ill.

[*] Notice: The term of this patent shall not extend beyond the expiration date of Pat. No. 5,706,190.

[21] Appl. No.: 598,561

[22] Filed: Feb. 12, 1996

Related U.S. Application Data

[63] Continuation-in-part of Ser. No. 375,481, Jan. 19, 1995.
[51] Int. Cl.[6] ................................................ G06F 19/00
[52] U.S. Cl. .............................................. 364/138; 364/505
[58] Field of Search .............................. 364/138, 139, 364/131–134, 505, 551.01, 557, 184, 185, 186, 187, 506, 507; 165/11.1, 14, 22, 32, 200, 201, 205, 287, 288; 236/46 R, 94; 340/825.06, 825.07

[56] References Cited

U.S. PATENT DOCUMENTS

| | | | |
|---|---|---|---|
| 4,448,033 | 5/1984 | Briccetti | 364/186 X |
| 4,843,084 | 6/1989 | Parker et al. | 364/505 |
| 4,931,948 | 6/1990 | Parker et al. | 364/505 |
| 4,942,613 | 7/1990 | Lynch | 364/557 |
| 5,481,481 | 1/1996 | Frey et al. | 364/558 X |

*Primary Examiner*—Joseph Ruggiero
*Attorney, Agent, or Firm*—Dick and Harris

[57] ABSTRACT

A fault-tolerant HVAC system capable of continued operation in the event of a thermostat malfunction. An HVAC controller controls the operation of an HVAC unit in accordance with a temperature signal output from the thermostat and indicative of air temperature of a conditioned space proximate the thermostat. The HVAC controller detects a thermostat malfunction and, in response thereto, instead controls the operation of the HVAC unit in accordance with a temperature sensor outputting a signal indicative of return air temperature from the conditioned space.

3 Claims, 20 Drawing Sheets

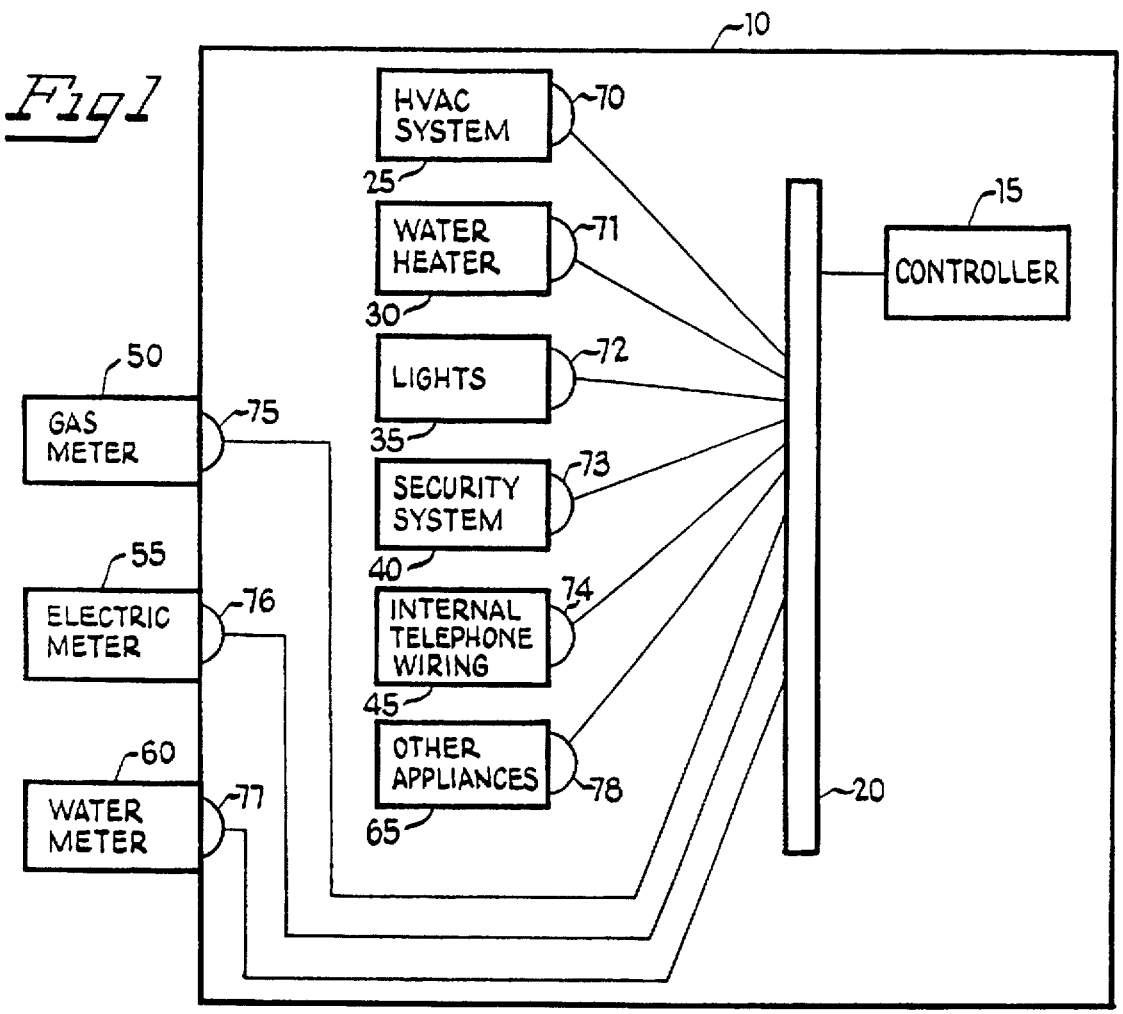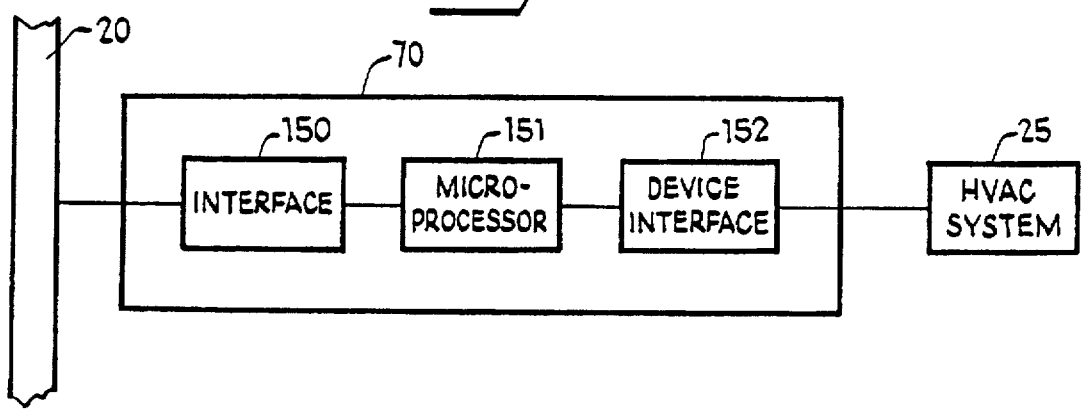

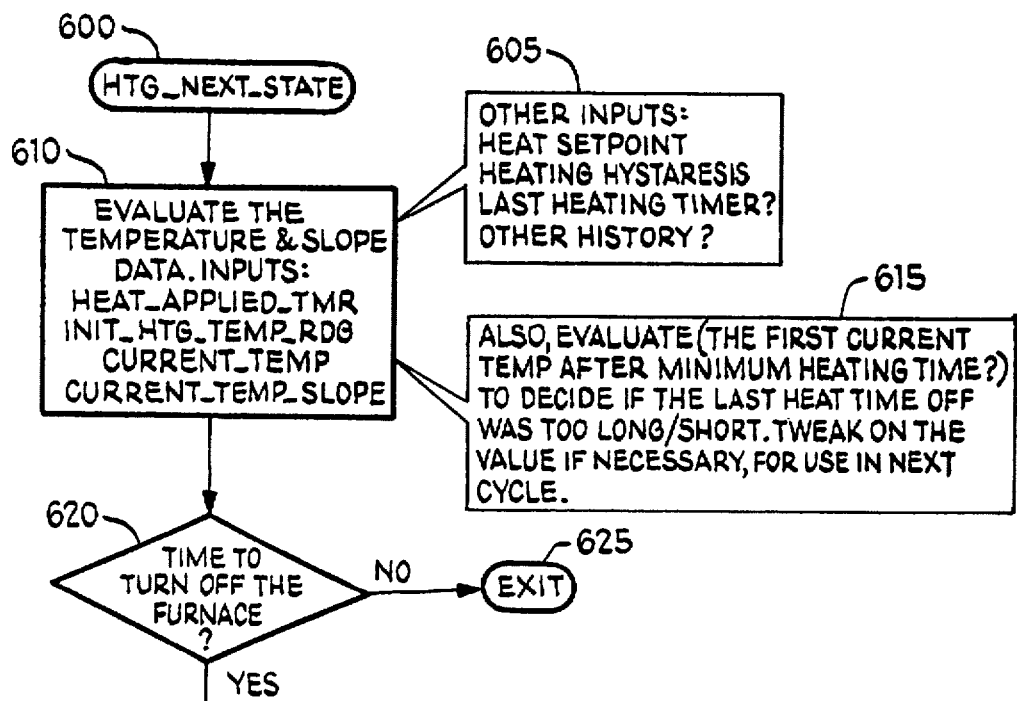
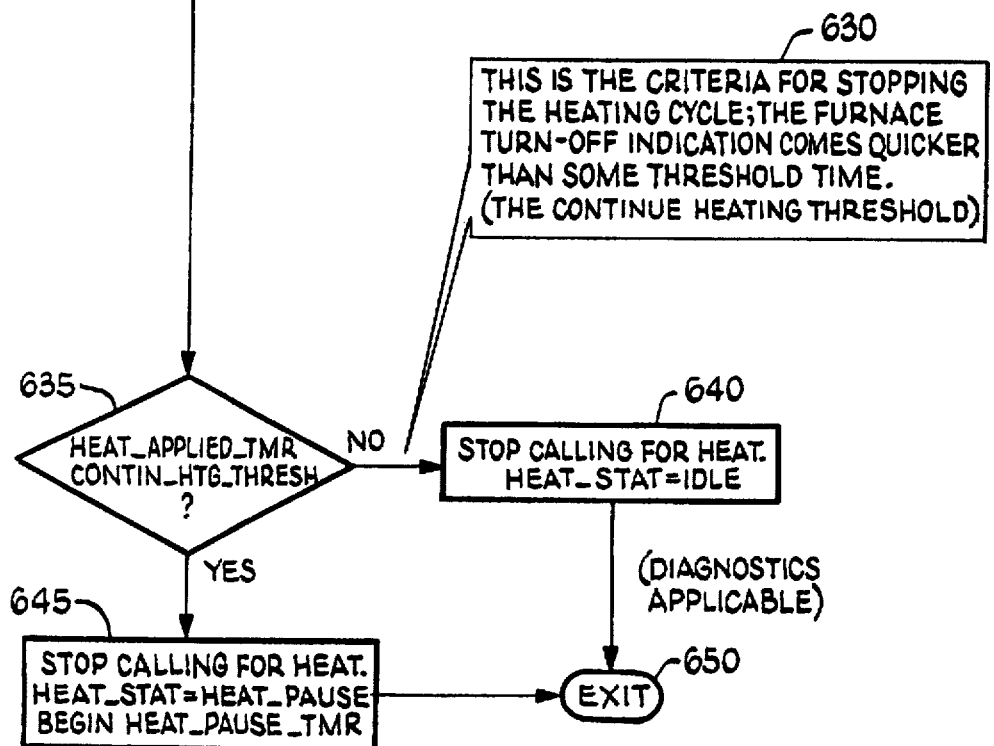
Fig 12

FAULT-TOLERANT HVAC SYSTEM

This is a continuation-in-part of copending U.S. patent application Ser. No. 08/375,481, filed Jan. 19, 1995.

BACKGROUND OF THE INVENTION

1. Field of the Invention

The present invention relates generally to automation systems for connecting appliances, such as computers, stoves, refrigerators, water heaters, and the like, and systems, such as residential heating, ventilation and air conditioning (HVAC) systems, in communication and/or in controlling relationships with one another, and with a central control device, such as a programmable microprocessor, in order to enable all such appliances and systems in a residence or other occupied space to operate in a centrally controlled manner. The present invention also relates to devices and methods for enabling such connected systems to communicate with other devices and systems which may be situated at locations remote from the particular residence or occupied space. The present invention also relates devices and methods for tolerating faults in HVAC systems, including the ability to maintain system operation following a thermostat malfunction.

2. The Prior Art

Private homes, apartment buildings, office buildings, and other occupied spaces and structures are becoming more and more regulated by electronic systems. For example, many, if not most of the appliances which are located in a modern home, such as a furnace or spa pool heater, and many of the basic mechanical systems, such as an HVAC system, are electronically controlled, by dedicated control devices, such as programmable microprocessors, situated within the specific device or system. It is already well known for homes to have sophisticated electronic automation systems, which may include electronic security and surveillance systems, systems for controlling and scheduling the operation of the home's HVAC system, a lawn sprinkler system, exterior and interior lighting, and so on. By interconnecting various appliances or systems, maintenance and operation of the residence can be handled in a more convenient and efficient manner.

Prior art automation systems for residences have typically been limited to the simplified scheduling of "on-off" switching, or some limited status monitoring.

One known standard for enabling the intercommunication of appliances and systems within a residence or other occupied space is the Consumer Electronics Bus (CEBus) (registered trademark), which is the home automation standard which has been developed by the Electronics Industries Association. The CEBus system is configured to make use of existing wiring in a residence, that is power line carrier communications (PL). CEBus has since been expanded to include twisted pair (TP) wire, coaxial cable (CX), infrared (IR), and radio frequency (RF). Other automation interappliance communication standards are also known. The interconnection between appliances, using standards such as CEBus, can be accomplished without the use of any controller devices external to the appliances being connected, if so desired.

Whatever automation communication standard is employed, in order to enable a given appliance or home mechanical system to communicate to other components in the automation system, each such appliance or mechanical system must be brought into communication with one another or with an overall system controller (if any), to enable instructions or information to be delivered between the connected appliances or mechanical systems. Such instructions or information would replace those which the user or operator would have performed directly to the given appliance or apparatus. Most existing appliances and mechanical systems which are electronically controlled are not configured to "talk" to each other, and/or are not configured to the CEBus standard (or other automation standard).

Many residential heating and cooling systems employ a thermostat, such as a wall mounted thermostat within a room of the conditioned space, as the primary source of temperature sensing, as well as for input of a desired temperature setpoint towards controlling the heating/cooling system to approximate the desired temperature. One shortcoming of such systems is that should the thermostat malfunction, or should a communication link between the thermostat and the heating/cooling system be severed, the entire HVAC system may cease operation, or may function improperly.

It would be desirable to provide an automation system which may be able to not only enable communication between various appliances, but can, if desired, connect the various appliances to a control device.

It also would be desirable to provide for the connection between various appliances in a home, which would also permit various diagnostic and analysis functions to be conducted, and communicated to a user/operator, so as to be able, for example, to inform the user/operator of an actual or anticipated failure in a component, or to inform the user of past performance or power consumption, and even possibly make projections of expected performance.

It is desirable to provide a method and apparatus, for use in connection with home automation systems, which will enable any electronically controlled device in a home, to be brought into communication with other appliances in a home automation system, including but not limited to, home automation systems which rely upon existing home wiring.

It is further desirable to provide a method and apparatus, for use in connection with home automation systems, which will even enable devices and mechanical systems in a home, which are not directly electronically controlled, to be brought into communication with each other as part of a home automation system. The retrofit of existing appliances within a residence, into an existing or newly established home automation system, would also be advantageous.

It would also be desirable to provide a method and apparatus which would enable a home automation system, and/or any of the devices and subsystems controlled thereby, to communicate with locations remote from the home.

It would still further be desirable to provide a method and apparatus for bringing home appliances and mechanical systems, such as gas-fired appliances and HVAC systems, into communication with and into a control relationship with, a home automation system.

It would further be desirable to provide a method and apparatus for detecting a thermostat malfunction, and for maintaining the overall operation of a HVAC system, albeit in a potentially "degraded" mode, until thermostat operation is restored.

SUMMARY OF THE INVENTION

The present invention comprises, in part, an automated space/residence management and communication system. The system includes at least one appliance apparatus disposed in the residence. The residence also is provided with at least one communication medium means (for example, power line communications via the existing electrical wiring). At least one interface means are provided for connecting the at least one appliance apparatus into a signal exchanging relationship with the at least one communication medium means.

At least one communication source is operably connected to the at least one communication medium means, for generating at least one first signal relevant to at least one of the at least one appliance apparatus. The at least one communication source is capable of disposing the at least one first signal into the at least one communication medium means, for reception at at least one location remote from the communication source. The at least one interface means is further operably configured so as to enable at least one of the at least one appliance apparatus to respond to the at least one first signal relevant to the at least one of the at least one appliance apparatus, for transmission to locations remote from the at least one appliance apparatus.

The at least one interface means is further operably configured so as to be capable of generating at least one second signal representative of at least one characteristic of the at least one appliance apparatus, as well as being operably configured so as to be capable of disposing the at least one second signal into the at least one communication medium means, for reception at at least one location remote from the at least one interface means.

The invention also comprises, in part, an interface apparatus, for use in a residence, or other space automation system, in which the residence is provided with at least one appliance apparatus, and at least one communication medium, for enabling the at least one appliance apparatus to engage in communication via the at least one communication medium with at least one communication source.

The interface apparatus includes first means capable of generating at least one first signal representative of at least one characteristic of the at least one appliance apparatus; second means, operably associated with the first means, capable of placing the at least one first signal into the at least one communication medium, for reception at at least one location remote from the at least one appliance apparatus; third means for reception of at least one second signal from the at least one communication medium, the at least one second signal being generated by the communication source. The third means are operably configured so as to place the at least one second signal into a condition suitable for communication to the at least one appliance apparatus, so as to prompt the at least one appliance apparatus to react in response to the at least one second signal.

The invention also includes means for facilitating connection of the at least one interface means into a signal exchanging relationship with the at least one appliance apparatus and with the at least one communication medium. In one preferred embodiment, in which the at least one communication medium means includes at least one insulated electrical wire, the means for facilitating connection is at least one insulation displacement connector, operably associated with the at least one interface means, for enabling rapid connection of the at least one interface means with the at least one insulated electrical wire.

In one preferred embodiment of the invention, the at least one communication source is at least one second appliance apparatus operably disposed within the residence. In another preferred embodiment of the invention, the at least one communication source is a control apparatus operably disposed within the residence. In still another preferred embodiment of the invention, the at least one communication source is a communication source disposed remotely to the residence, and operably connected in a signal exchanging relationship with the at least one communication medium means.

The invention also comprises, in part, a method for establishing an automated space/residence management and communication system. The method includes the steps of:

providing the residence with at least one appliance;

providing the residence with at least one communication medium;

operably connecting the at least one appliance to the at least one communication medium with at least one interface apparatus, such that the at least one appliance and the at least one communication medium are in a signal exchanging relationship;

operably connecting at least one communication source to the at least one communication medium, to enable the at least one communication source to generate at least one first signal relevant to at least one of the at least one appliance apparatus, the at least one communication source being capable of disposing the at least one first signal into the at least one communication medium, for reception at locations remote from the at least one communication source;

operably configuring the at least one interface apparatus so as to enable at least one of the at least one appliance apparatus to respond to the at least one first signal relevant to the at least one of the at least one appliance apparatus;

operably connecting the at least one interface apparatus to the at least one appliance apparatus and the at least one communication source;

operably configuring the at least one interface apparatus so as to be capable of generating at least one second signal representative of at least one characteristic of the at least one appliance apparatus and disposing the at least one second signal into the at least one communication medium, for reception at at least one location remote from the at least one interface apparatus.

The present invention also comprises, in part, an HVAC system capable of continued operation following a thermostat malfunction. The HVAC system includes a thermostat having an output signal indicative of air temperature of a conditioned space proximate the thermostat. An HVAC unit is provided, having a heat exchanger, a blower for drawing air through the heat exchanger, and at least one of a heating unit and a cooling unit for modifying the temperature of air passing through the heat exchanger. A discharge air plenum couples the HVAC unit to the conditioned space. The discharge air plenum provides a path for air discharge from the HVAC unit to be expelled into the conditioned space. A return air plenum also couples the conditioned space to the HVAC unit. The return air plenum provides a path for return air from the conditioned space to an inlet port of the HVAC unit. A temperature sensor is provided, having an output signal which is indicative of the return air temperature. An HVAC controller is coupled to the thermostat, the temperature sensor, and the HVAC unit. Means are provided within the HVAC controller for sensing the output signal of the thermostat, and for modifying air temperature within the conditioned space based upon the output signal of the thermostat. Means are further provided within the HVAC controller for detecting a malfunction of the thermostat. Further means are provided within the HVAC controller for sensing the output of the temperature sensor indicative of return air temperature, and for modifying air temperature within the conditioned space based upon the output signal of this temperature sensor, in response to a detected malfunction of the thermostat.

BRIEF DESCRIPTION OF THE DRAWINGS

FIG. 1 is a schematic representation of a residence, including various appliances and mechanical systems;

FIG. 9 is an expanded flow chart illustrating the steps of checking user level processes, from step 230 of FIG. 8;

FIG. 12 is an expanded flow chart illustrating the steps of determining the heating cycle's next state, from step 570 of FIG. 11;

FIG. 15 is a highly simplified schematic of the functional components which may go into an AIM, for various applications, according to the present invention;

BEST MODE FOR PRACTICING THE INVENTION

Figure 2:
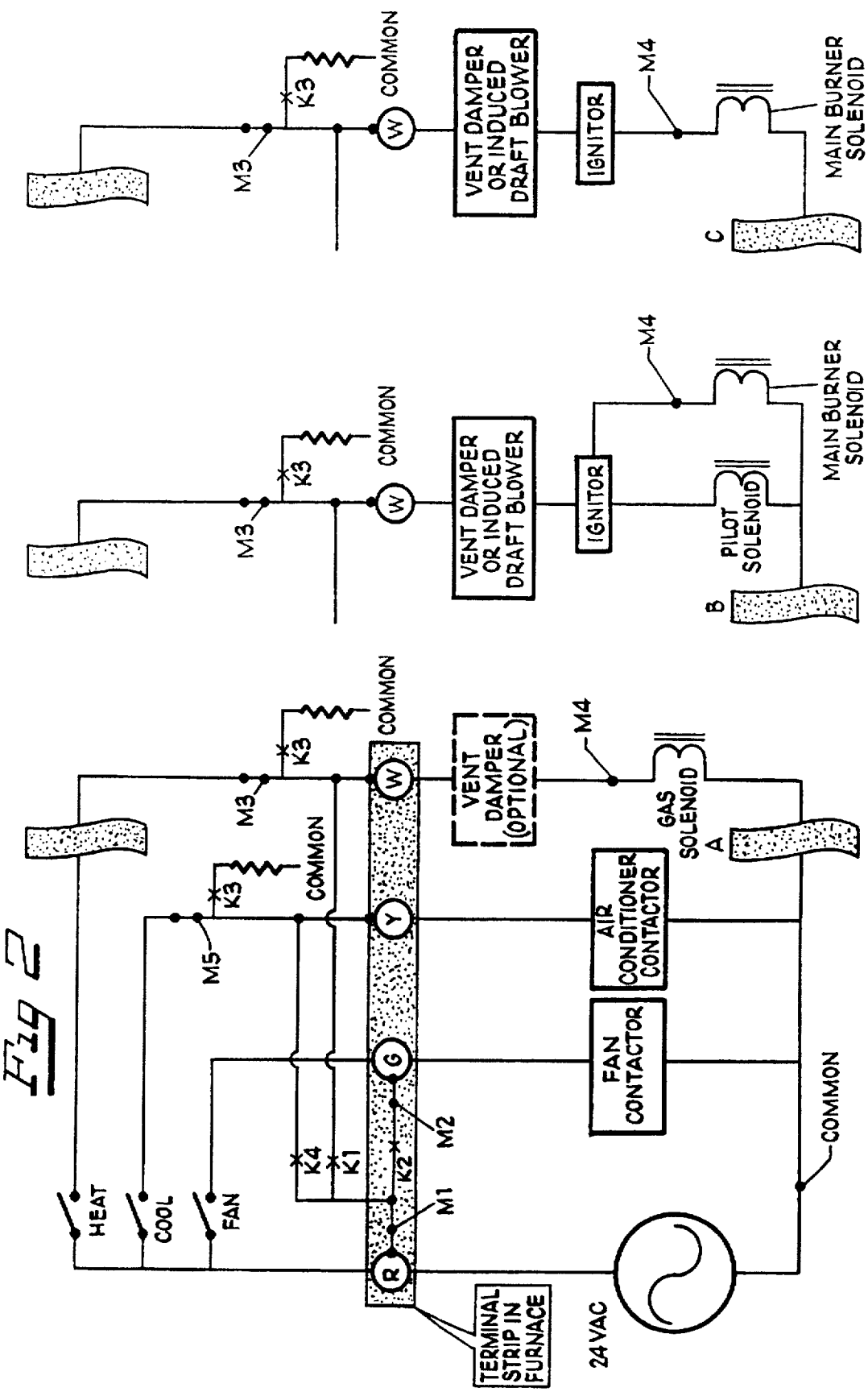
FIG. 2 is a schematic representation of the connections between a furnace and its corresponding AIM.

While this invention is susceptible of embodiment in many different forms, there is shown in the drawings and will be described herein in detail, several specific embodiments, with the understanding that the present invention is to be considered as an exemplification of the principles of the invention and is not intended to limit the invention to the embodiments illustrated.

FIG. 1 represents an embodiment of the present invention, schematically illustrating a residence 10. An automation system controller 15 may be provided, which is connected, for example, to the residence electrical wiring system 20. Automation system controller 15 may be configured to include, for example, an Energy Management System (EMS) network controller which can serve as scheduler, user interface, load research information storage and display service for all AIM modules in a home installation.

As described in further detail herein, a utility may use a telephone modem to remotely access information stored in the EMS network controller. The EMS may be embodied in a laptop computer, or a dedicated controller and user interface, which would be programmed to communicate with, monitor, control, schedule and log data from the various appliances which are connected into the overall automation system.

Initial installation and configuration of the overall automation system would be done through the EMS. The EMS controller would preferably be equipped to store a number of recent past diagnostic events for each of a number of appliances, and receive and store the data received from all appliances, preferably in small time increments, such as one minute intervals, for an extended period of time, such as 60 days. The EMS may also be modem-equipped both for receiving incoming instructions and inquiries from remote locations, and would also be able to make preprogrammed outgoing data reporting calls, such as to a utility.

Residence 10 is provided with, for example, HVAC system 25, water heater 30, lights 35, security system 40, internal telephone wiring system 45, gas meter 50, electric meter 55, water meter 60, or other appliances 65 (such as a hot tub, clothes dryer, etc.).

In accordance with the present invention, each of the foregoing apparatus and/or systems, among others in the residence, as desired, will be provided with an appliance interface module (AIM) 70–78 (or others). Each AIM 70–78 will be connected to the electronic control device with which each such appliance is constructed. For example, AIM 70 will be connected to the central controller of HVAC 25, which typically is a preprogrammed, or programmable microprocessor, which controls the functions of the furnace, blower, air conditioner unit or whatever components make up HVAC 25. AIM 70 will also be connected between HVAC 25 and the residence wiring system 20 (power line carrier), or to any other communications carrier, as desired, to which automation system controller 15 is connected.

Each AIM will typically contain a suitably programmed microprocessor, and interface hardware appropriate to the automation system standard (such as CEBus) which is being used in the particular residence. Connection of each AIM to each respective appliance will be, when possible, by connection to low voltage, such as 24 vac, circuits within the appliances. Monitoring and diagnostic functions will be achieved through passive sensors configured to not interfere with whatever safety functions the particular appliance is provided. In addition, each AIM will include relays to interact with the circuitry in the appliance, and signal inputs from temperature sensors, flow sensors, voltage sensors and current sensors, in such combinations and numbers as may be required for any particular appliance.

According to the specific installation, some AIMs will be configured solely to monitor appliance operation, while others will be configured to control appliance operation (on-off or input power variation control) as well. Still other modules may be advantageously configured so that when appropriately installed in a given appliance can, upon receipt of appropriate instructions from the automation controller or EMS, actually override the built-in electronic or mechanical control for an appliance or override otherwise conflicting instructions received from remote sources. For example, as described in further detail hereinafter, such an AIM, connected to a furnace may enable a remote instruction to override a furnace's thermostat setting or preprogramming. Each AIM will be so connected to its respective appliance, that upon removal of power to the AIM, the appliance will be disconnected from the automation system and will be returned to normal operation.

For electrical-only appliances, the AIMs typically may be simply installed, by placement in the power line, between the appliance and the residence power outlet. This may be especially appropriate for AIMs having simple monitoring, data gathering or processing, or on/off or variable power control functions.

Figure 3:
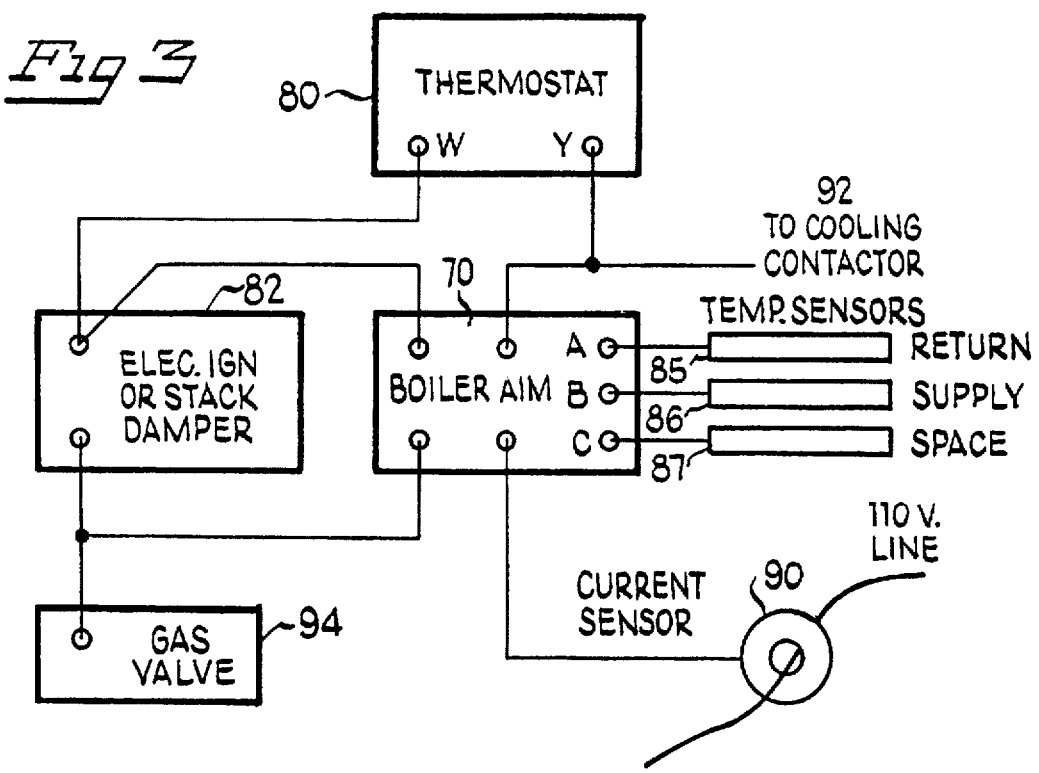
FIG. 3 is a schematic illustration of the connections between a gas boiler AIM and several of the components of a boiler heating system.
Figure 4:
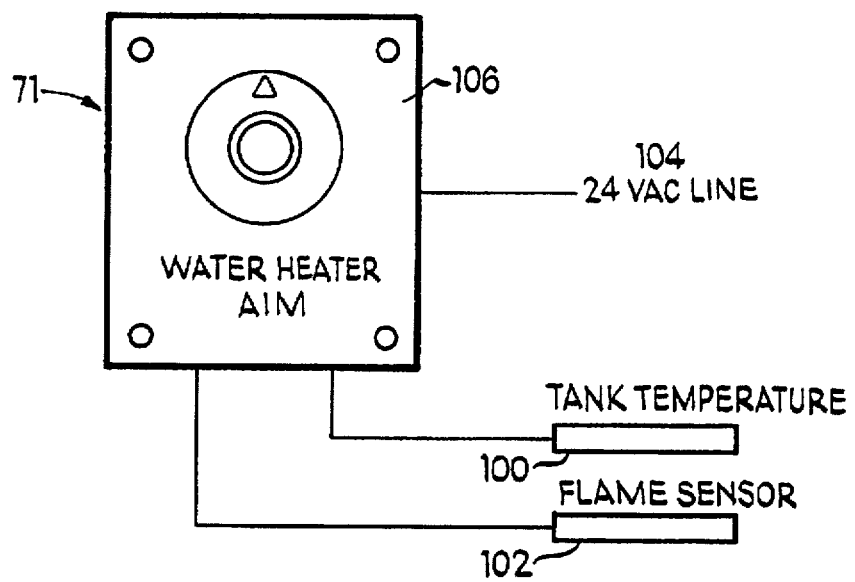
FIG. 4 is a schematic illustration of the connections between a water heater AIM and several of the components of a water heater.

For gas-operated appliances, the AIMs typically will be attached at various points in the internal control circuitry of the appliance, using Insulation Displacement Connectors (ICDs), as discussed herein. FIGS. 2, 3 and 4 illustrate some representative possible attachment arrangements. AIMs for gas appliances may be powered by the residence power line, or may be powered by the appliance internal power circuits, among other conventional power sources, such as batteries. Some gas appliance AIMs will require that certain initial operating values be established. For example, an initial nominal burner firing rate (in BTUs) may be set onto a gas dryer AIM by the installer pressing certain DIP switches built onto the AIM. Of course, such information could likewise be transmitted by other means, such as communications from the EMS. The AIMs for gas appliances may also include, as described hereinafter, such components as flow measuring devices, which may need to be installed in the gas flow lines near the point of connection with the specific appliances.

It is intended that the AIMs will be configured so as to be installed by persons of moderate technical skill, such as appliance repair persons or moderately handy home owners. In this way, the appliances of preexisting, possibly older appliances and residences into automated residences is facilitated. The intended simplicity of installation and enhanced data acquisition, storage and communication functions of the AIMs, means that the need to customize automation arrangements for residences on an individualized basis is substantially reduced.

Each AIM will preferably be configured to be a small package device, which can be mounted internally to each specific appliance, or externally thereto. Power would be supplied via connection to the 120 vac line within the appliance when required. Power consumption monitoring and data storage circuitry would be provided, connected through that same power connection, so as to allow the AIM to monitor real power consumption of the appliance. The module would be provided with the appropriate inter-device language capability, and connection, e.g., via power line carrier, to permit communication with other devices connected as part of the overall automated system. The modules may be constructed using IDCs (which clamp onto an insulated wire, piercing the insulation but not severing the wire inside, to establish an electrical connection, examples include "Self-Stripping T-Tap Female Disconnects," as made by 3M Corporation) and quick connect terminals for facilitated, no splicing required installation. The electronics will preferably be enclosed in a durable plastic (or other suitable material) housing, for attachment by screws, bolts, etc. The module should be ruggedly constructed for operation in a broad temperature range as appropriate for the particular environmental conditions; for example, $-40°$ C. to $+70°$ C. in an outside environment. In addition, a non-volatile memory may be provided, so as to be able to store module address and other information and maintain such information even through power failures. Specific examples of the types of functions which the AIMs will perform are discussed hereinafter.

If HVAC component 25, for example, were a gas furnace (possibly in combination with an air conditioner unit), AIM 70 would be appropriately configured to be able to: 1) monitor instantaneous and total natural or LP gas usage and electric usage of the furnace (and air conditioner); 2) provide inputs for setting nominal firing rates for the burner and power consumption of electrical devices, such as a compressor, during installation, so as to enable reporting of gas and electric power consumption during operation; 3) monitor supply air and return air temperatures (from suitably placed temperature sensors within the furnace); 4) have input ports for receiving data from externally placed sensors, such as temperature sensors in individual rooms for actual room temperature sensing; 5) have input ports for receiving remote commands for heating, raising or lowering of set points for heating and cooling, etc., from remote sensors or full-function thermostats, remote automation controllers or other devices; 6) monitor and report, to the automation system controller, the status of pilot flame, gas burner, stack damper, induced draft blower, circulating blower, etc.; 7) monitor and report, to the automation system controller, failures such as blocked stack, clogged filter, pilot or main burner failure, compressor failure or failure of the AIM itself.

FIG. 2 is a schematic illustration of how an AIM might be connected to furnace circuitry. The heavy thickness lines are wires in AIM 25. Points M1, M2, etc., are monitoring points in AIM 25 which can detect the present or absence of 24 vac. FIG. 2 illustrates three examples of furnace configurations, and a monitoring location on the main burner solenoid for each example. The variation "A" represents a typical pre-1980 configuration in which the furnace has a standing pilot, and a thermostat controls the operation of the main burner. A typical early 1980's variation of "A", would be provided with a vent damper. Mid-1980's variations "B" and "C" would feature a vent damper, electronic ignition of an intermittent pilot, or of the main burner directly. For a typical configuration circa 1993, in variations "B" and "C", the vent damper would be replaced with induced draft. In addition to the low voltage connections illustrated in FIG. 2, AIM 70 would also include connections which would establish an electrical power monitoring location (to show blower operation), as well as return and output air temperature sensors. In order to make the installation as simple as possible, the temperature sensors (not shown) for the exit and return ducts may be configured in the form of a small sensor, which may be fitted into a ring shaped magnet, which may be simply affixed by hand, into the interior walls of the return and exit air plenums. Electrical leads would extend from the sensors to the AIMs.

The following chart indicates some of the symptoms which can be detected, employing the connections mentioned above and discussed with reference to FIG. 2, and the likely component failures which would cause the observed symptoms:

| Furnace Diagnostics | Symptom/Indication |
| --- | --- |
| Clogged filter | large differential air temperature, in to out, heating or cooling or gas solenoid cycling on and off while thermostat requesting heat |
| fan failure | no fan power or unusually high fan power when M2 says fan is on, or xx seconds after burner lights. |
| High limit failure | very high exit air temperature |
| AIM failure | Various causes |
| main burner failure from various causes | thermostat requests heat, M3, no volts on gas valve, M4, within xx seconds or volts on M4 and no fan or temperature rise within xx seconds. |
| Ignition failure | Main burner energized for short intervals, 5–30 seconds, 3 cycles within 57 Minutes, and never staying on longer than 30 seconds. |
| room temperature unacceptable | extreme high or extreme low room temperature |
| transformer failure, door open, power off? | No 24 vac present, M1 |
| compressor failure | exit air temperature same as inlet temperature |
| compressor, low charge | low exit air temperature below xx F |
| evaporator coils frozen | below freezing exit air temperature |

Preferably, AIM 70 may be suitably programmed so as to have a "learning" mode. Accordingly, AIM 70 may be set up so that, for a certain preselected period of time (which AIM 70 would be able to track), AIM 70 would observe the operation of the furnace (or other appliance), and learn to recognize, for example, the usual nominal delay from burner ignition to circulating fan start up, the offset between a thermostat setting and the return air temperature, delays in ignition sequences, and differentials between return and exit air temperature, in both heating and cooling cycles. Once having "learned" what expected proper "behavior" is for a particular appliance, the AIM, such as AIM 70, can watch for deviations from such normal values, and communicate detected failures and/or danger conditions to controller 15. Controller 15 may then communicate such failure or hazard conditions to the user/operator in a variety of ways. An additional feature with which AIM 70 would be provided, would be to be able to reset the furnace under the appropriate controlled conditions (such as by reopening the thermostat contacts) if the furnace has undergone a total self-shutdown following repeated cycles of ignition failure.

A further advantage of the "learning" mode of the AIMs is that once certain characteristics of the operation of the heating system, such as the differential between a desired thermostat setting and exit and return air temperatures is learned, the AIM can "substitute" for certain failed components. For example, a space may have a plurality of temperature sensors, some of which may be physically separate from a thermostat. Failure of one or more such sensors might leave the furnace controller "blind" with respect to the actual temperature in the particular space. The AIM, however, having "learned" of the appropriate temperature differentials for various thermostat temperature settings, can determine, at least approximately, the actual space temperature which would otherwise be sensed, and supply this information to the furnace controller (or take over for it), until such time as the failed equipment has been replaced.

Figure 22:
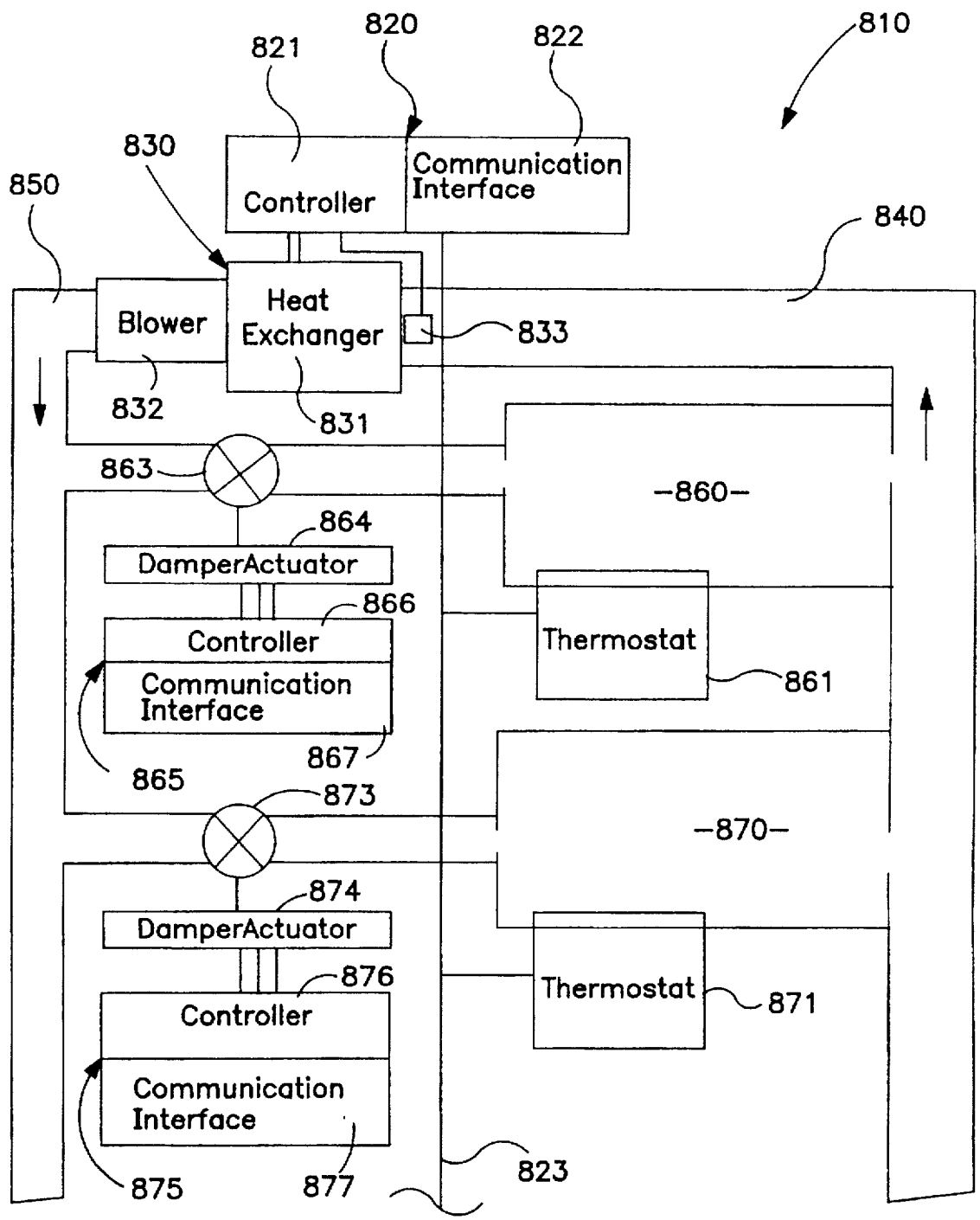
FIG. 22 of the drawings is a schematic illustration of a fault-tolerant HVAC system.

A fault tolerant HVAC system 810 is shown in FIG. 22 as comprising HVAC controller 820, heating/cooling unit 830, return air plenum (duct) 840, and discharge air plenum (duct) 850. Heating/cooling unit 830 includes a source of heat and/or cold (not shown), coupled to heat exchanger 831. This may include, among other things, an electric or gas-fired furnace, and air conditioning cooling coils. This source of heat and/or cold is transferred, in large part, to breathable, circulating air passing from an inlet port to an outlet port of heat exchanger 831. Heating/cooling unit 830 further includes circulating blower 832, for drawing breathable air through heat exchanger 831, as well as past temperature sensor 833, which provides an output signal indicative of return air temperature passing from return air planum 840 through the inlet port of heat exchanger 831. Return air plenum 840 provides a path for return air from one or more conditioned spaces, or zones, including zone 860 and zone 870 of FIG. 22, to the inlet port of heating/cooling unit 830.

Discharge air plenum 850 carries heated or cooled air from heating/cooling unit 830 to zones 860 and 870. Each conditioned zone has at least one associated damper. For example, damper 863 controls, in part, the percentage of air expelled by heating/cooling unit 830 into discharge air plenum 850 which is to be directed into zone 860. Similarly, damper 873 controls, in part, the percentage of air expelled into discharge air plenum 850 which is to be directed into zone 870. Each damper may be set to a substantially full open position, wherein a maximum quantity of air is allowed to pass through the damper. Each damper may further be set to a substantially full closed setting, wherein little or no air is allowed to pass through the damper. Moreover, each damper is preferably adjustable over a plurality of intermediate of settings between fully open and fully closed.

HVAC controller 820 includes controller 821 and communication interface 822. Controller 821 may comprise a conventional microprocessor or microcontroller, including associated random accesses memory and read only memory, containing, among other things, stored program code and data for execution by the microprocessor. Communication interface 822 allows controller 821 to communicate with various remote, or peripheral devices coupled to a common communication bus 823. As shown in FIG. 22, communication bus 823 permits controller 821 to communicate with thermostat 861, associated with zone 860, and with thermostat 871, associated with zone 870. Communication bus 823 further permits controller 821 to communicate with damper communication interface 867, associated with damper 863, and with damper communication interface 877, associated with damper 873.

Communication bus 823 allows controller 821 and these remote, peripheral devices, among others, by exchanging packets of digital data over the bus. For example, controller 821 may construct a digital packet of data for receipt by damper communication interface 877, containing data indicating a desired damper setting of damper 873. This packet may include, among other things, a header having a device address, or device I.D., uniquely indicative of communication interface 877. This packet may further contain a command field, indicating a command that the damper is to be adjusted, as well as a data field, indicating a particular adjustment to be made to damper 873. Each remote, or peripheral device capable of receiving data from communication bus 823, such as damper communication interface 877, will continuously monitor the data placed by any device upon communication bus 823, examining the header for a device address, or device I.D., indicative of the intended receiving device.

Similarly, controller 821 may, via communication interface 822, place data packets upon communication bus 823 requesting a thermostat, such as thermostat 861 or thermostat 871, to reply with a further data packet indicating the current air temperature proximate the thermostat and within the associated zone, or conditioned space of the thermostat. Accordingly, each thermostat includes a temperature sensor, and further includes means such as a microprocessor and a communications interface, for placing reply data indicative of the air temperature proximate the thermostat onto communication bus 823, for receipt by HVAC controller 820.

HVAC controller 820 is further coupled to return air temperature sensor 833 of heating/cooling unit 830, for sensing the current temperature of the return air from return air plenum 840. HVAC controller 820 is further coupled to heating/cooling unit 830, for controlling the overall operation of the unit. For example, HVAC controller 820 may switch heating/cooling unit 830 on and off, selecting a heating or cooling operation to be initiated. HVAC controller 820 may further control the amount of heat and/or cold applied to breathable air circulating through heat exchanger 831. HVAC controller 820 may also govern the actuation, as well as the speed, of circulating blower 832, which may be of the variable speed variety.

Damper 863 includes an associated damper controller 865 and damper actuator 864. Damper controller 864 includes controller 866 and communication interface 867. Similarly, damper 873 includes an associated damper controller 875, including controller portion 876 and communication interface 877. Damper 873 further includes an associated damper actuator 874.

Each damper controller's communication interface 867, 877 is capable of receiving commands from HVAC controller 820 over communication bus 823, including commands indicative of a desired setting of the associated damper. These commands are received and processed by the controller portion 866, 876 of the damper controller, which may include a conventional microprocessor or microcontroller, together with associated random access memory and read only memory containing, among other things, program code and data for instructing the microprocessor to perform the commanded tasks relative to the associated damper.

Each damper actuator 864, 874 is preferably powered by a 24 volt alternating current supply. Moreover, each remote, or peripheral device coupled to communication bus 823, such as controllers 866 and 876, is preferably powered by a communication power line comprising a part of communication bus 823. This communication power line may, for example, comprise a conductor carrying 13.5 volts direct current. The damper controller circuitry of damper actuator 864, 874 and controller 866 and 876, are preferably constructed in a manner such that should either the 24 V AC or the 13.5 V DC power be lost, the associated damper 863, 873 will automatically open to their fully open orientation.

In normal operation, HVAC controller 820 will receive data indicative of the current air temperature within zone 860, as well as a desired temperature within zone 860, from thermostat 861. HVAC controller 820 will further receive data indicative of the current air temperature within zone 870, as well as a desired air temperature for zone 870, from thermostat 871. HVAC controller 820 will employ this information in controlling the operation of heating/cooling unit 830 towards modifying the air temperature in each zone to bring the measured temperature into proximity with the desired temperature setpoint for the zone. In particular, HVAC controller 820 may, among other things, activate, deactivate, and change the speed of blower 832; place heating/cooling unit 830 in a cooling mode, a heating mode, or deactivate the heating/cooling unit 830; and vary the temperature that heating/cooling unit 830 applies to circulating air passing through heat exchanger 831, such as by modulating a flame within a modulating gas-type furnace. HVAC controller 820 will simultaneously, controller the positioning of dampers 863 and 873, apportioning the air discharged from heating/cooling unit 830 into discharge air plenum 850 to the various conditioned zones. HVAC controller 820 will continually modify the operation of heating/cooling unit 830, as well as the positions of dampers 863 and 873, towards modifying the air temperature within zones 860 and 870, in an attempt to bring the air temperatures of the associated zones as close as possible to the desired temperature for these zones, as entered by a user within a user interface portion of the associated thermostat 861, 871.

Although, in the embodiment illustrated in FIG. 22, a fault-tolerant HVAC system is shown in a multi-zone controlled environment, including dampers associated with each zone, it is also contemplated that the present fault-tolerant HVAC system may be employed in association with a single-zone system. In such a single-zone system, all dampers are eliminated, and the entire conditioned space is heated and/or cooled based upon a main, or primary temperature sensor, and a main, or primary desired temperature selection, such as by thermostat 861. The entirety of the controlled space will, accordingly, receive conditioned air of approximately the same volume, at substantially the same temperature.

Figure 23:
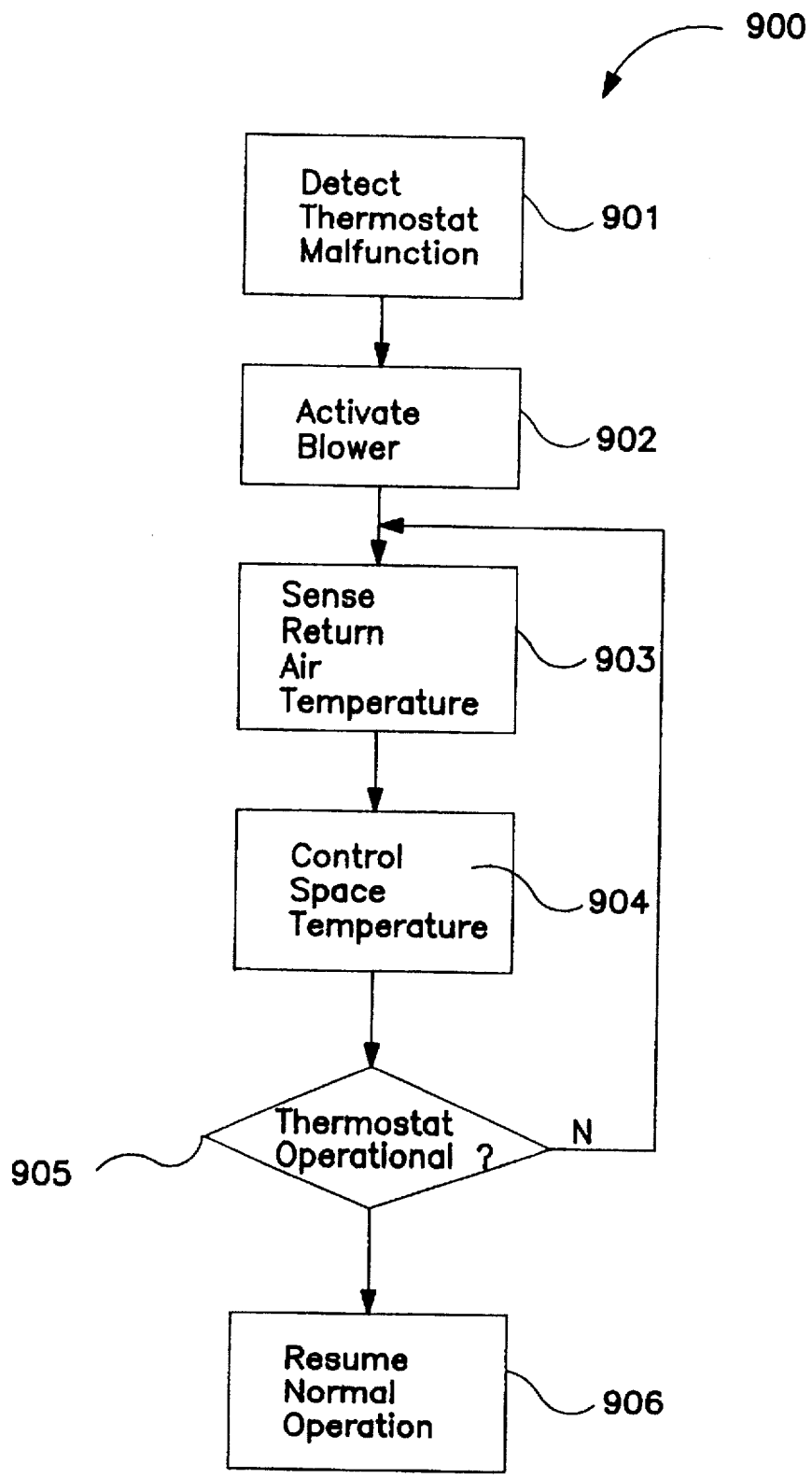
FIG. 23 of the drawings is a flow chart illustrating the steps of the continued operation of a single-zone HVAC system in the event of a thermostat malfunction.

As shown in FIG. 23, HVAC controller 820 (FIG. 22) may be programmed in a single-zone environment so as to be capable of performing a sequence of operations 900 in the event of a thermostat malfunction, towards maintaining overall operation of the HVAC system in the even of such a malfunction. As shown in FIG. 23, step 901, the HVAC system will first detect that a thermostat malfunction has occurred. This may occur in a number of ways. For example, a thermostat may recognize its own malfunction, such as by periodically executing a self-diagnostic routine within its associated microprocessor. Upon detecting a malfunction, such as an invalid output of an associated air temperature sensor, the thermostat may place a data packet upon the communication bus for receipt by the HVAC controller, including data which indicates that a malfunction has occurred, as well as an identification of the particular type of malfunction. Moreover, the HVAC controller may detect that a thermostat has become entirely non-operational, or incapable of communicating with the HVAC controller. For example, the HVAC controller may place a data packet upon the communication bus, requesting the current temperature from the sensor associated with a particular thermostat. If the thermostat does not reply with the requested data within a predetermined period of time, the HVAC controller will presume that the particular thermostat has malfunctioned. Moreover, the HVAC controller may become incapable of communicating with a thermostat, due to an overall loss of DC power upon the communication bus, interrupting power to each of the communication controllers of the remote, peripheral devices connected to the communication bus. Should a voltage detector associated with the HVAC controller and the communication bus detect such a power interruption, the HVAC controller will treat this inability to communicate with the thermostat as a thermostat malfunction.

Should no thermostat malfunction be detected, normal operation of the single-zone HVAC system will continue, in the manner described above. Should, however, a thermostat malfunction be detected, the HVAC controller will next activate circulating blower 832 (FIG. 22), as shown in step 902 of FIG. 23 (provided, of course, that the blower was not already activated during the normal conditioning of the single-zone system). Blower 902 will remain activated for a predetermined and sufficient amount of time, in order to draw a sufficient quantity of return air past return air temperature sensor 833 (FIG. 22) to permit a relatively accurate measurement of the return air temperature. When such a sufficient, predetermined time period has elapsed, the HVAC controller will sense the return air temperature, as shown in step 903. Next, based upon the return air temperature, HVAC controller will continue to control the temperature of the single-zone as shown in step 904. The temperature of the controlled space will be maintained essentially in the manner described above, with respect to the normal operation of the single zone system, with the exception that the return air temperature sensor 833 (FIG. 22), rather than the temperature sensor associated with the thermostat, will provide the necessary feedback for use by the HVAC controller in controlling the operation of the heating/cooling unit. The setpoint, or target temperature, will be the last desired temperature setting received as a packet of digital data from the thermostat, before it malfunctioned. In other words, in the event of a detected thermostat malfunction, the return air temperature sensor, sensing air passing from the return air plenum into the inlet port of the heating/cooling unit, will be used as an approximation of the temperature which would otherwise be measured within the conditioned space, had the thermostat been functioning properly.

Next, as shown in step 905, the HVAC controller will perform a test, or an interrogation, of the malfunctioning thermostat, towards determining whether normal operation of the thermostat has resumed. The HVAC controller may, for example, detect the reapplication of power to the communication bus, following an earlier power loss which previously interrupted power to the malfunctioning thermostat. Moreover, the HVAC controller may continue to periodically place data packets upon the communication bus, requesting the current temperature from the malfunctioning thermostat. Should the malfunctioning thermostat respond properly, the thermostat will be deemed operational.

Should the thermostat continue to be deemed non-operational, a branch will be taken back to step 903, the return air temperature will be continually sensed, and the temperature of the conditioned space will continue to be controlled based upon the sensed return air temperature. If, however, the thermostat is now deemed operational, transition will be taken to step 906, and normal operation of the HVAC system will be resumed, in the manner described above.

Figure 24:
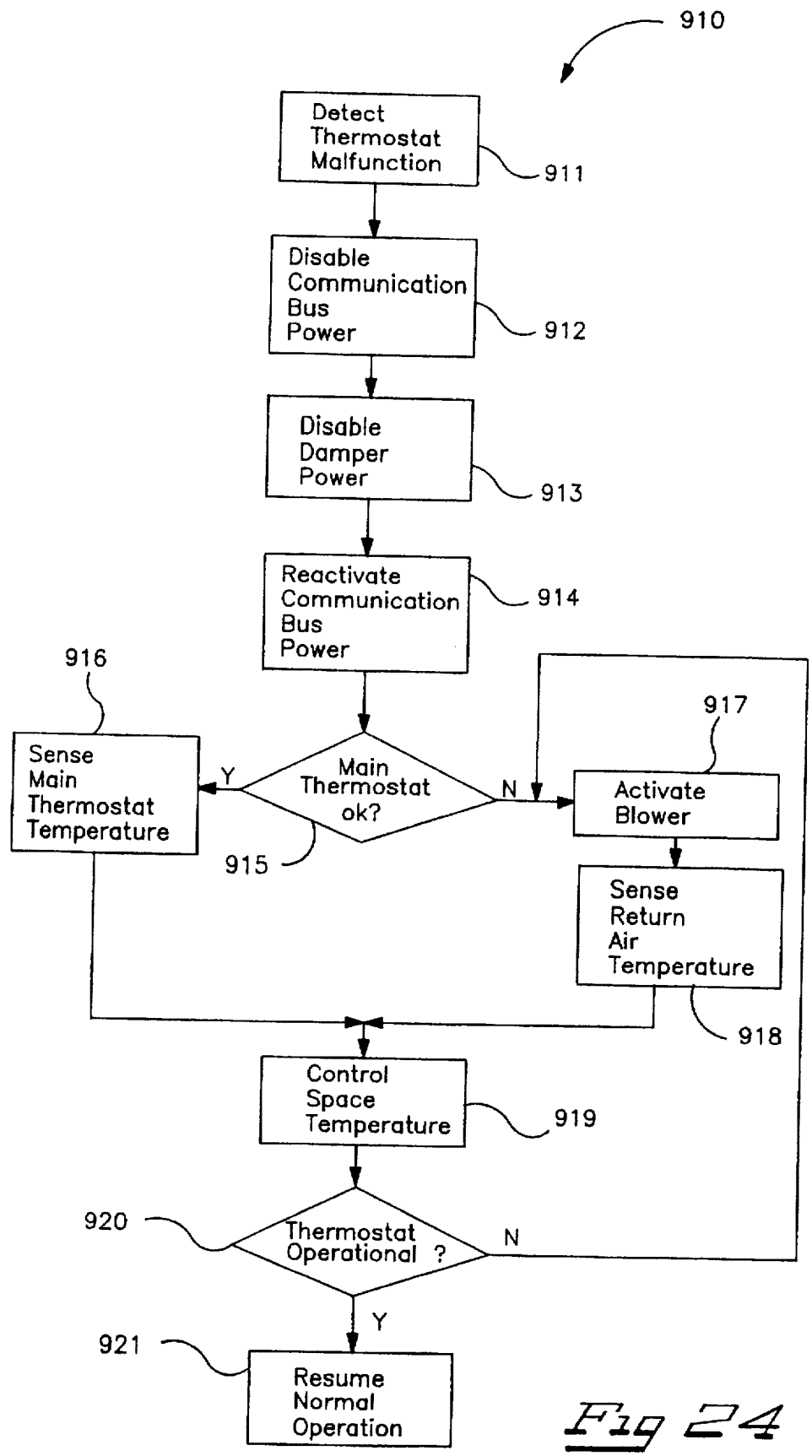
FIG. 24 of the drawings is a flow chart illustrating the steps of the continued operation of a multi-zone HVAC system in the event of a thermostat malfunction.

FIG. 24 is a flow chart showing the series of operations 910 performed by the HVAC controller in a multi-zone system, such as the multi-zone system of FIG. 22, in response to a detected thermostat malfunction. Prior to a detected thermostat malfunction, the HVAC controller will continually maintain normal operation of the HVAC system, in the manner described above with respect to multi-zone systems. The HVAC system will, for example, continue to control the operation of the heating/cooling unit, as well as the positioning of the various dampers associated with the individual zones of the overall conditioned space.

As shown in step 911 of FIG. 24, the HVAC controller is capable of detecting a thermostat malfunction, in each of the ways described above with respect to a single-zone system (i.e., a thermostat self-diagnostic detects an error; a thermostat fails to respond to a request for data; or a loss of power upon the communication bus).

Should a thermostat malfunction be detected, transition is taken to steps 912 and 913, wherein all dampers within the HVAC system are forced to a fully open condition. As shown in step 912, communication bus power is first disabled, under the control of the HVAC controller, removing power to the controlling microprocessors of each of the remote, peripheral devices. Next, as shown in step 913, the 24 volt alternating current supply to the dampers is disabled by the HVAC controller. This, in turn, forces all dampers to a substantially open condition, inasmuch as the continued application of power is generally required in order to close or partially close the dampers. Next, as shown in step 914, power to the communication bus is reapplied by the HVAC controller, enabling the continued operation of those thermostats and other remote, peripheral devices which have not malfunctioned.

Next, as shown in FIG. 24, transition is taken to step 915, and a test is performed to determine whether a main thermostat is still operational. Any of the plurality of thermostats within a multi-zone system, such as one of thermostats 861 and 871 of FIG. 22, may be designated a main, or primary thermostat. If the malfunctioning thermostat, as detected in step 911, is not the thermostat designated as the main thermostat, and if the main thermostat is still operational (i.e., does not indicate a self-diagnostic fault and is still capable of communicating with the HVAC controller) transition is taken to step 916.

As shown in step 916, the HVAC controller will continue to control the operation of the HVAC system as in normal multi-zone operation, with the exception that all dampers are forced open (as described above), and with the further exception that the air temperature, as sensed by a temperature sensor associated with the main thermostat, is used as feedback for controlling the continued operation of the circulating blower, and other aspects of the heating/cooling unit 830. The desired temperature setpoint, as entered by a user via the main thermostat, will be used in controlling the HVAC system.

If the main thermostat is the malfunctioning thermostat, or, if the main thermostat has malfunctioned, in addition to another thermostat malfunction detected within step 911, transition is taken to step 917, and blower 832 (FIG. 22) is activated for a predetermined, sufficient period of time to enable a sufficient quantity of air to pass return air temperature sensor 833, to enable this temperature sensor to sense an approximation of the overall air temperature within the controlled zones. Following this sufficient period of blower operation, transition is taken to step 918, and the output of temperature sensor 833, indicative of the return air temperature, is sensed by the HVAC controller. Next, regardless of whether the main thermostat-temperature was sensed, in step 916, or the return air temperature was sensed, in step 918, transition is taken to step 919, wherein the temperature of the entirety of the conditioned space (i.e., all zones within the multi-zone system) are simultaneously controlled based upon the sensed temperature. Next, as shown in step 920, a test is performed to determine whether the thermostat deemed malfunctioning in step 911 has resumed proper operation. If not, transition is taken to step 915, and the HVAC controller will again test to determine whether the main thermostat is operational. Otherwise, transition is taken to step 921, and normal operation of the HVAC system is resumed.

FIGS. 15–21 are schematic illustrations of representative circuitry which might be employed in an AIM. FIG. 15 is a highly simplified schematic of the functional components which would go into any AIM, for any application, according to the present invention. For the purposes of discussion, FIG. 15 will be referenced to that portion of FIG. 1, showing the connection between the residential wiring system 20, and HVAC 25. It must be remembered that in the place of residential power wiring system 20, a dedicated wiring circuit, the house phone lines, radio frequency, fiber optic, or any other suitable (or readily available) communication medium can be employed.

AIM 70, generally stated, would require an interface 150 (such as a CEBus interface, if CEBus is the protocol standard being used), a microprocessor (which may be of known configuration) 151, and a device-specific interface 152 (which would include the insulation displacement connectors described herein).

Figure 16:
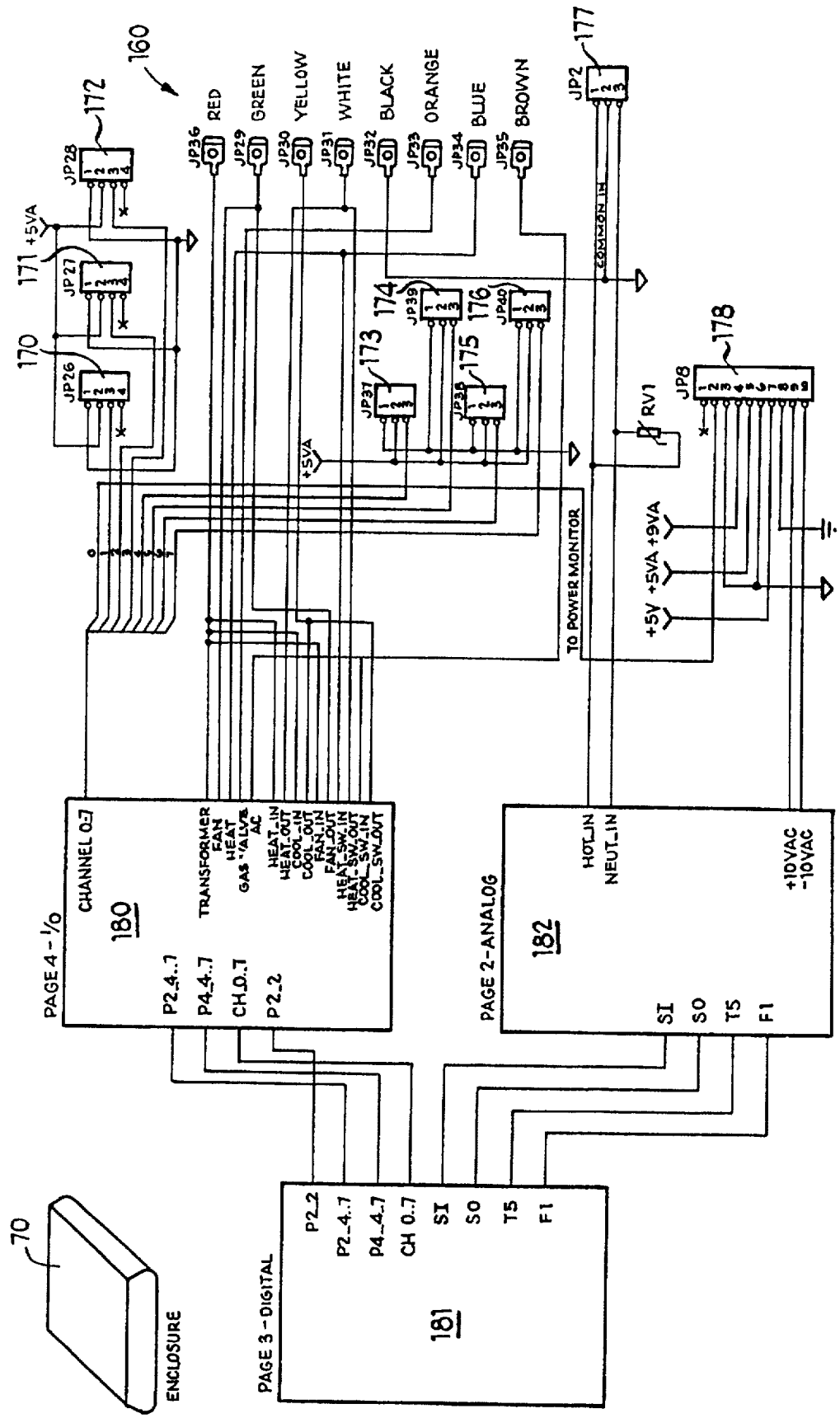
FIG. 16 is a high-level schematic of an AIM, such as AIM 70 of FIG. 1.
Figure 17:
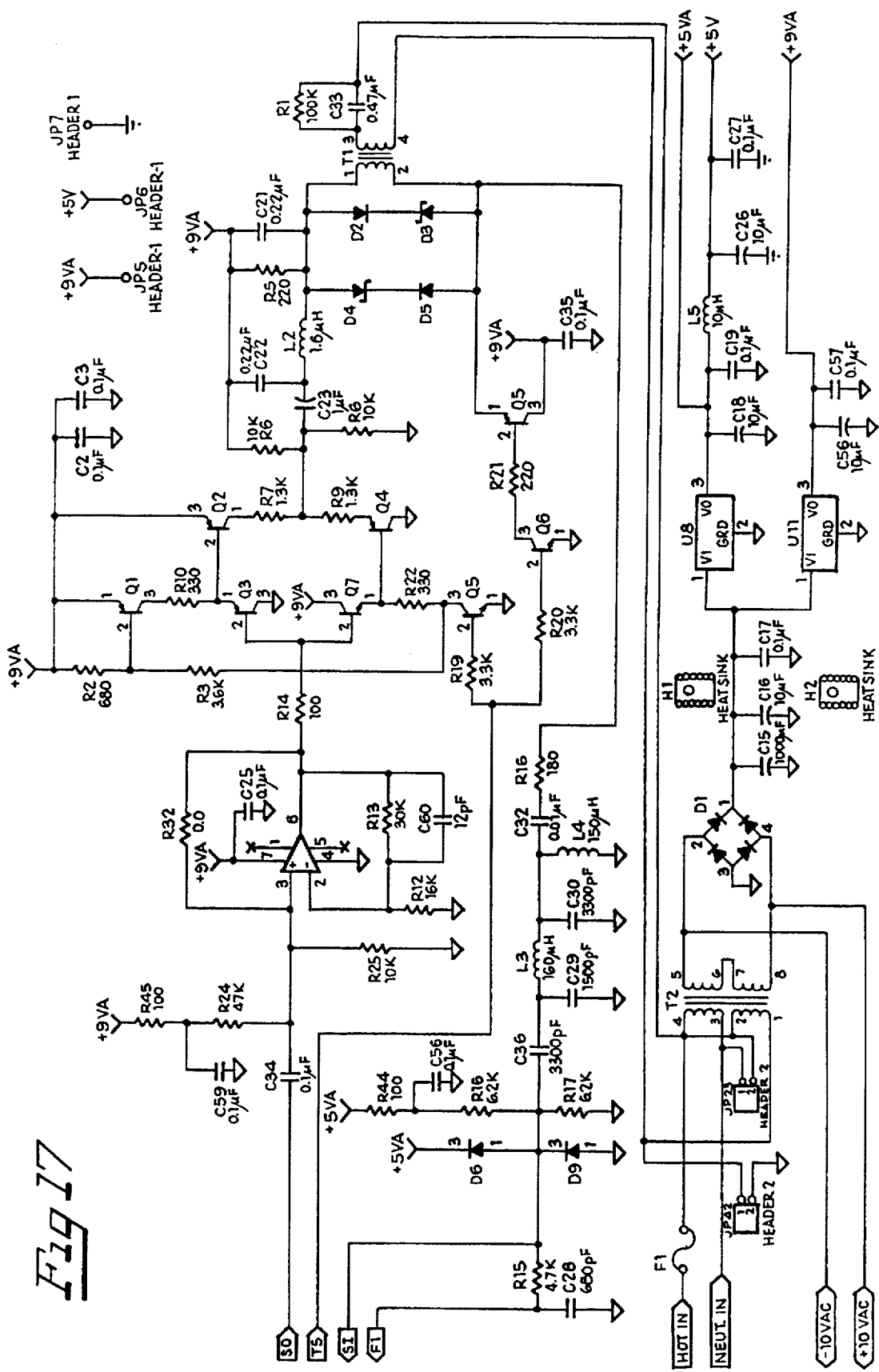
FIG. 17 is a schematic illustration of the analog processing portion of an AIM.
Figure 18:
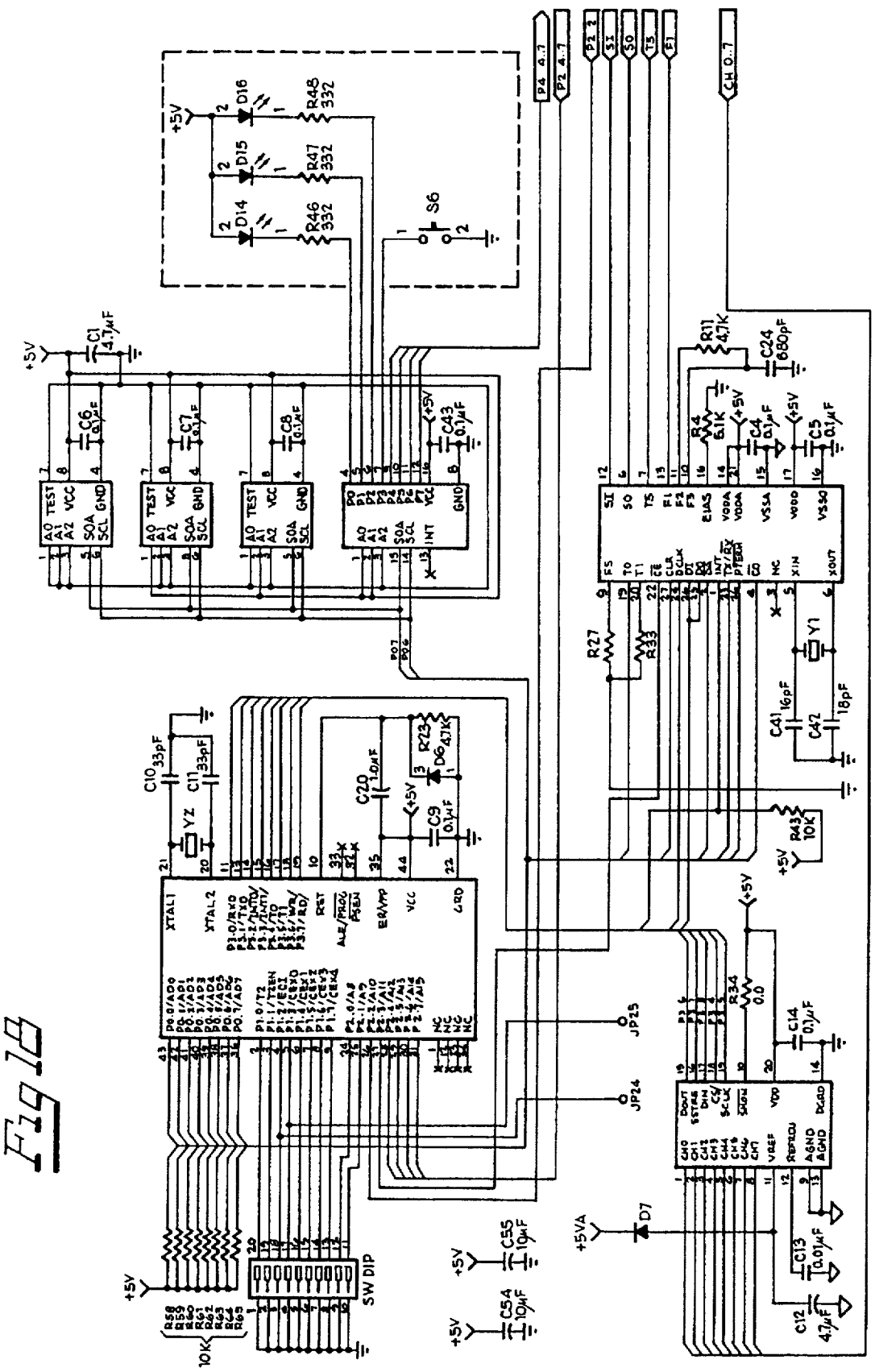
FIG. 18 is a schematic illustration of the digital processing portion of an AIM.
Figure 19:
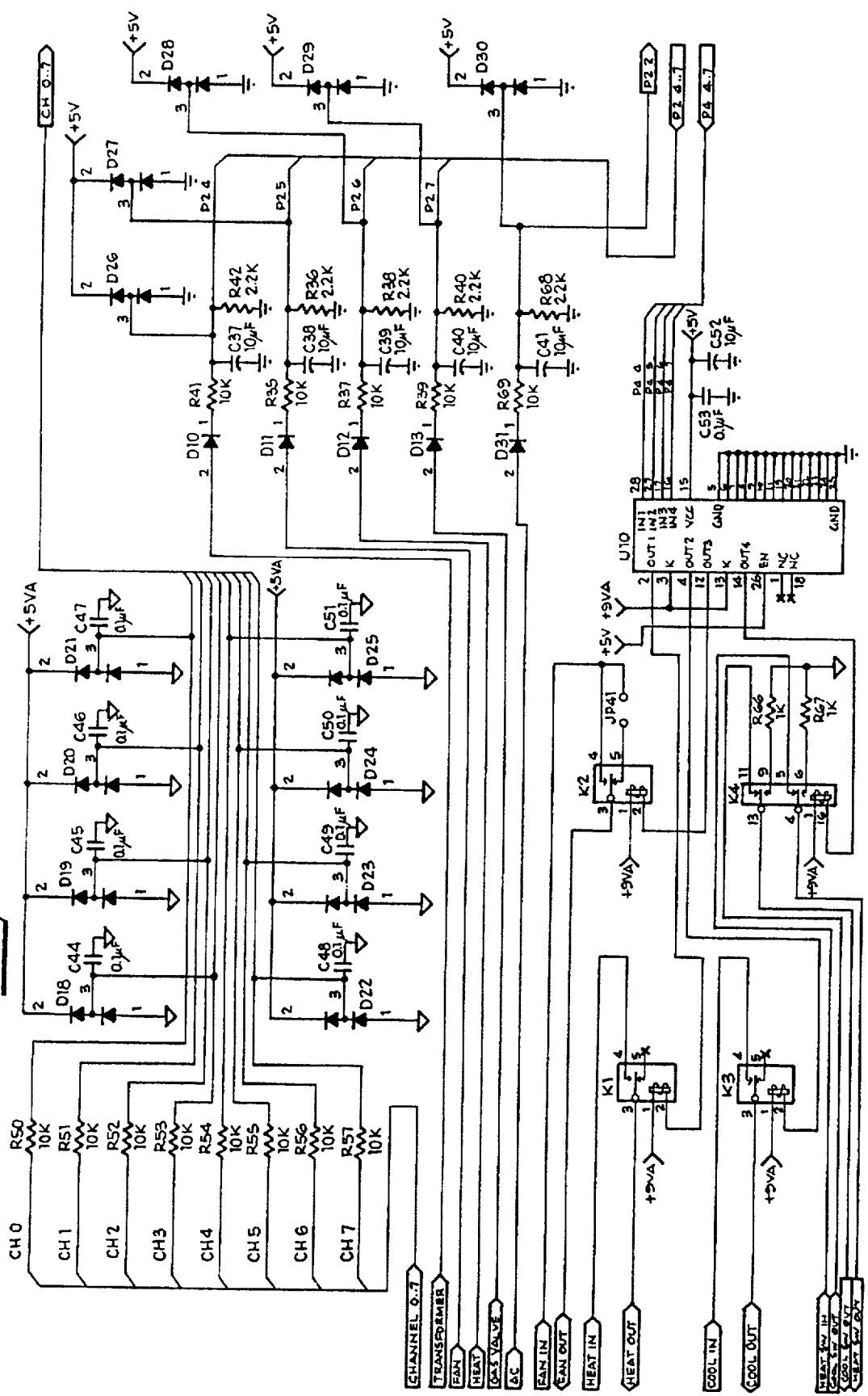
FIG. 19 is a schematic illustration of the I/O portion of an AIM.

FIG. 16 is a high-level schematic of an AIM, such as AIM 70. In the embodiment of a furnace-attached AIM, connectors 160, each of which could be an insulation displacement connector, as previously described, would be attached to various furnace components, according, for example, to well-known wiring color-coding techniques, for facilitating installation of the device by non-expert or educated amateur personnel. For example, red lead goes to the furnace transformer, green lead to the fan, yellow lead to the heat control, etc. Block 180 represents the I/O portion for AIM 70, and is illustrated in further representative detail in FIG. 19. Block 181 represents the digital processing portion of AIM 70, and is illustrated in further representative detail in FIG. 18. Block 182 represents the analog processing portion of AIM 70, and is illustrated in further representative detail in FIG. 17.

It is contemplated that the configuration of all AIMs will be substantially based upon the general configuration depicted in FIGS. 15–19. Of course, it is also contemplated that such a configuration be altered; for example, by removing or disabling various components which would not be required for the specific AIM to be utilized—as would be obvious to one with ordinary skill in the art. The specific numerical values of the specific components, and even the specific combinations of particular components illustrated are understood to be representative only, and variations therein may be made by one of average skill in the art. In addition, the software/programming which will enable each AIM to perform its desired functions may be readily arrived at by one of average skill in the art, once the specific desired tasks have been defined (power consumption monitoring, timing of operations, data acquisition, etc.), of course, within the inherent capacity of the particular appliance to be controlled or otherwise acted upon by the particular AIM in the desired manner. Access to the residential wiring 20 (FIG. 1) is accomplished through power cord 177.

Figure 20:
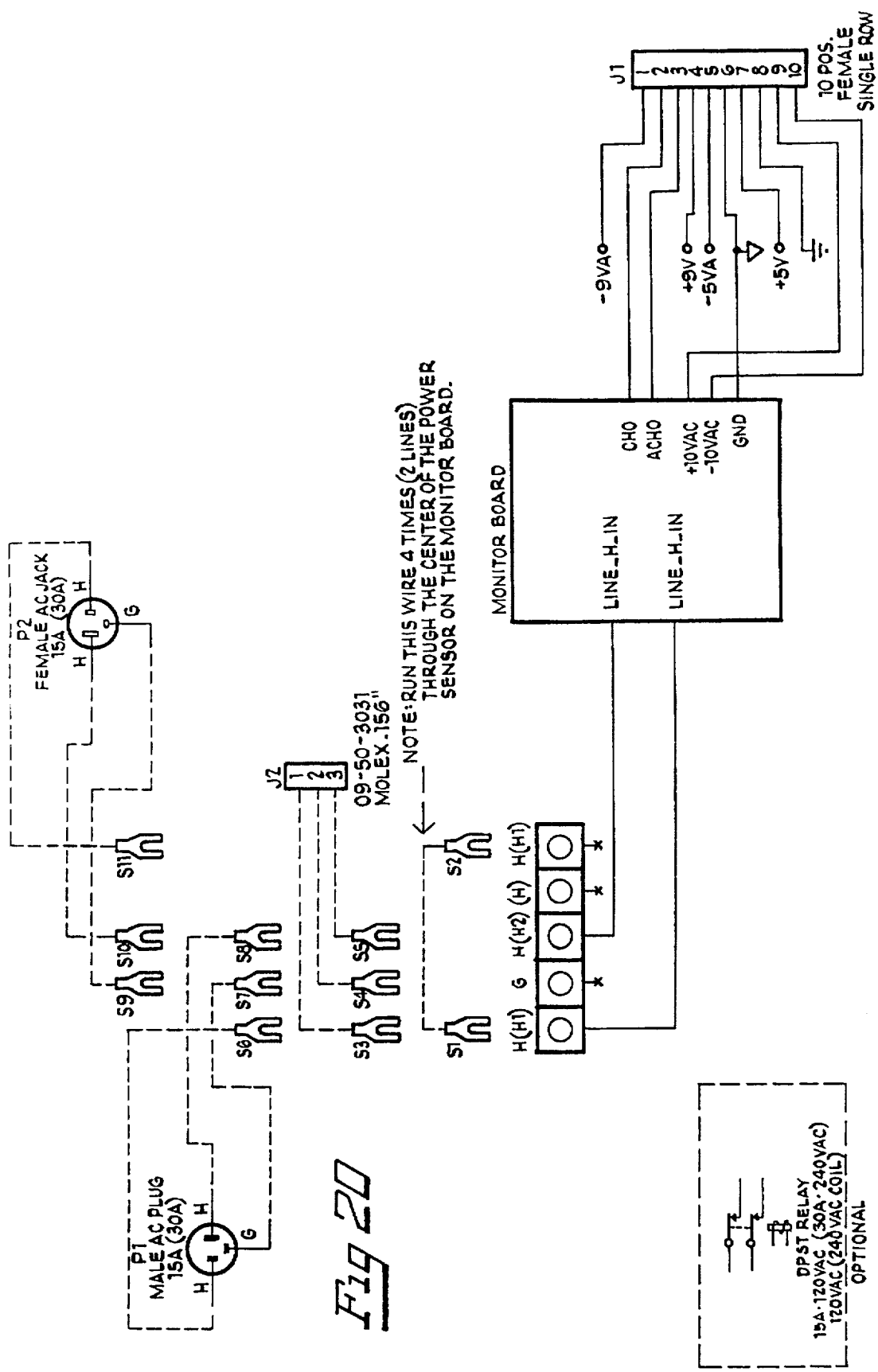
FIG. 20 is a schematic illustration of the connections for a power monitor apparatus, which may form a portion of an AIM, according to some embodiments of the present invention.
Figure 21:
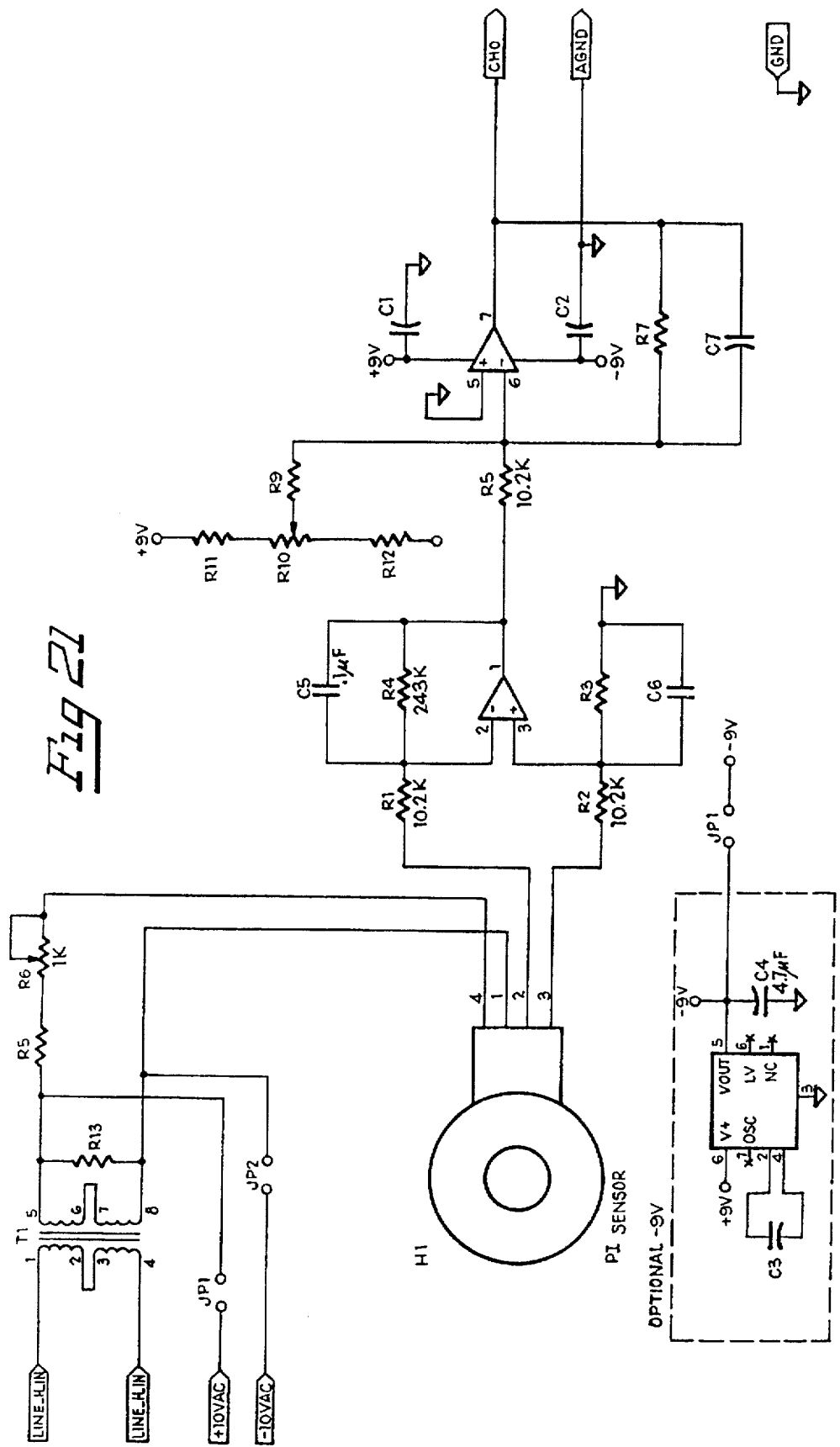
FIG. 21 is a schematic illustration of a portion of the power monitor apparatus, according to FIG. 20.

FIGS. 20–21 show circuit configurations for a power monitor board, which may be used as a "daughter" board within an AIM in many desired applications, such as a furnace application. The function of the apparatus illustrated in FIGS. 20–21 is to act as a power monitor. Utilizing an electrical current sensor 185 (FIG. 20), suitably connected in the power supply line of the particular component or appliance being monitored, the instantaneous power consumption of the component or appliance can be obtained, and reported back to the main AIM circuitry, via connection 178, of FIG. 16. In addition, there can also be AIMs whose sole function is power monitoring and tracking, which would use the signals acquired via the daughter board, to develop data concerning not only instantaneous power consumption, but also power consumption as a function of time. As discussed with respect to FIGS. 16–19, the specific numerical values of the specific components, and even the specific combinations of particular components illustrated are understood to be representative only, and variations therein may be made by one of average skill in the art. In addition, the software/programming which will enable the apparatus of FIGS. 20–21 to perform its desired functions may be readily arrived at by one of average skill in the art, once the specific desired tasks have been defined.

If HVAC 25 is a gas boiler, AIM 70 would be appropriately configured to be able to: 1) monitor instantaneous and total natural or LP gas usage and electric usage of the boiler (and air conditioner); 2) provide inputs for setting nominal firing rates for the burner and power consumption of a compressor during installation, so as to enable reporting of gas and electric power consumption during operation; 3) monitor supply water and return water temperatures (from suitably placed temperature sensors); 4) have input ports for receiving data from externally placed sensors, such as temperature sensors in individual rooms for actual room temperature sensing; 5) have input ports for receiving remote commands for heating, raising or lowering of set points for heating and cooling, etc., from remote sensors or full-function thermostats, remote automation controllers, or other devices; 6) monitor and report, to the automation system controller, the status of pilot flame, gas burner, stack damper, induced draft blower, circulating pump, etc.; 7) monitor and report, to the automation system controller, failures such as blocked stack, clogged filter, pilot or main burner failure, compressor failure or failure of the AIM itself.

One possible electrical connection arrangement, for connection of AIM 70 to HVAC including a gas boiler is illustrated in FIG. 3. AIM 70 includes connections to thermostat 80, stack damper or electronic ignition 82, temperature sensors 85, 86, 87, current sensor 90 (sensing power consumption), air conditioning contactor 92, and gas valve 94.

AIM 71, connected to water heater 30, which may be a gas or electric water heater, will be configured to: 1) be connected to the automation system controller by low voltage twisted pair wiring so as to alleviate the need for connection to the power line circuit or to batteries (though such may be employed if desired for other reasons); 2) monitor gas usage (if gas heater) or monitors electric usage (if electric heater); 3) monitor tank temperature near location of existing control point; 4) monitor burner or heating coil activity; 5) have input ports for enabling connection to remote controls to permit remote raising and lowering of water temperature set point. An AIM 71 for water heater 30 may be configured not to require the presence of 120 vac at the appliance. The operating temperature which may be required would be 0° C. to +70° C.

FIG. 4 illustrates one possible connection arrangement for AIM 71. AIM 71 is connected to water tank temperature sensor 100, heater gas flame sensor 102 (which could alternatively be an electric heater coil temperature sensor, in the embodiment of an electric heater), and to 24 vac line 104. AIM 71 could be mounted within or on the exterior thermostat 106 of water heater 30, and could even be provided with hardware to control a low voltage motor for mechanically varying the thermostat setting.

Appliance 65 may be a hot tub or swimming pool heater, for example, in which case, AIM 78 would be configured to: 1) monitor instantaneous and total natural or LP gas usage and electric usage of the water heating components; 2) provide inputs for setting nominal firing rates for the burner and/or power consumption of a heating coil and/or pump during installation, so as to enable reporting of gas and electric power consumption during operation, such as the consumption of power for 120 vac or 240 vac pumps; 3) monitor supply water and return water temperatures (from suitably placed temperature sensors); 4) have input ports for receiving instructions or inquiries from externally placed locations; 5) have input ports for receiving remote commands for heating, raising or lowering of set points for heating (for example, in combination with the system EMS, to provide an intelligent time clock for a spa heater); 6) monitor and report, to the automation system controller, the status of pilot flame, gas burner, circulating pump, etc.; 7) monitor and report, to the automation system controller, failures such as thermostat failure, clogged filter, pilot or main burner failure, pump failure or failure of the AIM itself. Presence of 120 vac in the appliance would be assumed. Operating temperatures may be between 0° C. and +70° C.

Should appliance 65 be a clothes dryer, for example, which may be gas or electrically heated, AIM 78 may be configured to: 1) monitor gas and/or electric consumption; 2) defer or initiate drying operation; 3) indicate drying cycle completion through the automation system communications to a remote user interface or to an EMS display if present. Presence of 120 vac in the appliance would be assumed. Operating temperatures would be between 0° C. and +70° C.

AIM 75, which may be connected to a gas meter 50, will, in the case of a meter having a LCD or similar digital readout, be connected to the readout device, so as to monitor the signals going to the indicator. Alternatively, in the case of mechanical readouts, the AIM 75 may be fitted with appropriate rotational or other movement sensors which will convert the mechanical input of the indicator dials to an appropriate signal.

In a preferred embodiment of the invention, the signal from AIM 75 will be inputted into a remote radio transceiver (not shown). Both AIM 75 and the radio transceiver would preferably be battery powered, for both ease of installation (no wiring to install) and for safety concerns (line power should not be near gas meters). A base station transceiver may be installed inside a house and may be connected to controller 15.

AIM 75 and controller 15 would communicate with two-way protocol so as to assure proper data transmission and reception. The communication would have a low duty cycle so as to preserve battery power in the remote unit. AIM 75 would have memory, preferably non-volatile memory, so as to store data, during periods when RF transmission is interrupted. Transmission may be in the 900–928 MHz range. Up-to-date RF technology would be employed for maximized range, durability and reliability. AIM 75 preferably would be programmed to perform a variety of functions, such as averaging consumption data over time, reporting data upon demand, reporting attempted tampering, and reporting low battery conditions, and to have a unique identifying address, so as to permit multiple AIM 75's in close proximity to one another. The transmitted data may be encoded or subject to authentication messages, as may be desired. A minimum desired reliable range should be 200 feet, through several walls, or 500 feet through open field. AIM 75 should be configured to endure harsh environmental conditions, for those installations at outdoor gas meters.

In a variation of the RF configuration, the transceiver base station may be mounted on a mobile platform, such as a utility company vehicle, to permit rapid, nonobtrusive meter reading, of meters from large numbers of residences over an area limited only by the reliable range of the radio link.

AIM 78 may be suitably configured and connected to electric meter 55 as well. Since line power is immediately available with minimal connection effort, and there are no serious safety issues (as there are with gas meters), a preferred embodiment would tap the line power to provide power for the AIM. The signal from the AIM could be delivered to the controller 15 via the power line carrier, twisted pair, etc. or alternatively, a battery powered radio setup such as described with respect to gas meter 50 could also be used.

Figure 5:
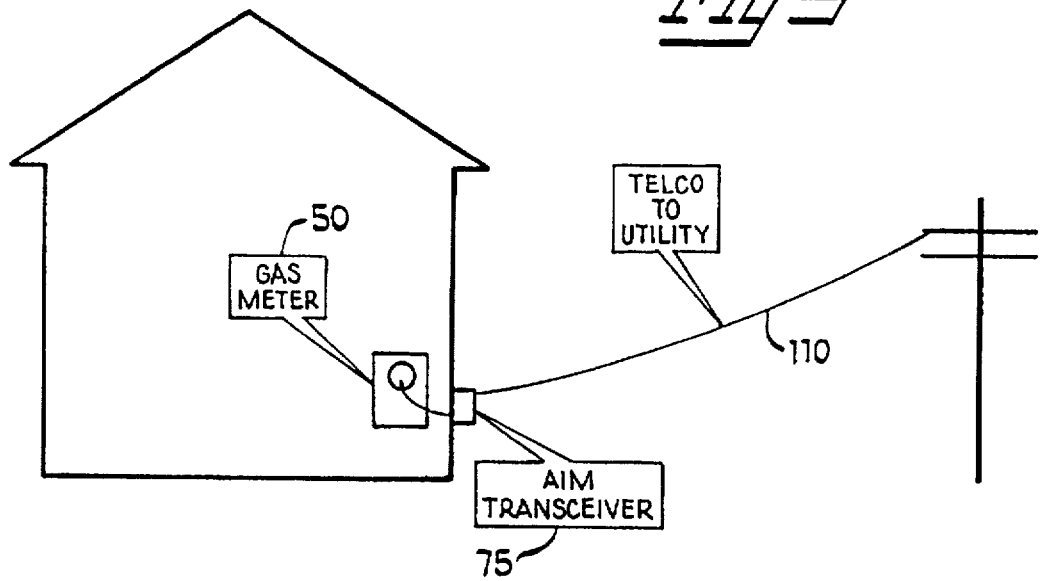
FIG. 5 is a schematic illustration of a configuration for communication between a gas meter, its AIM, and a utility.
Figure 6:
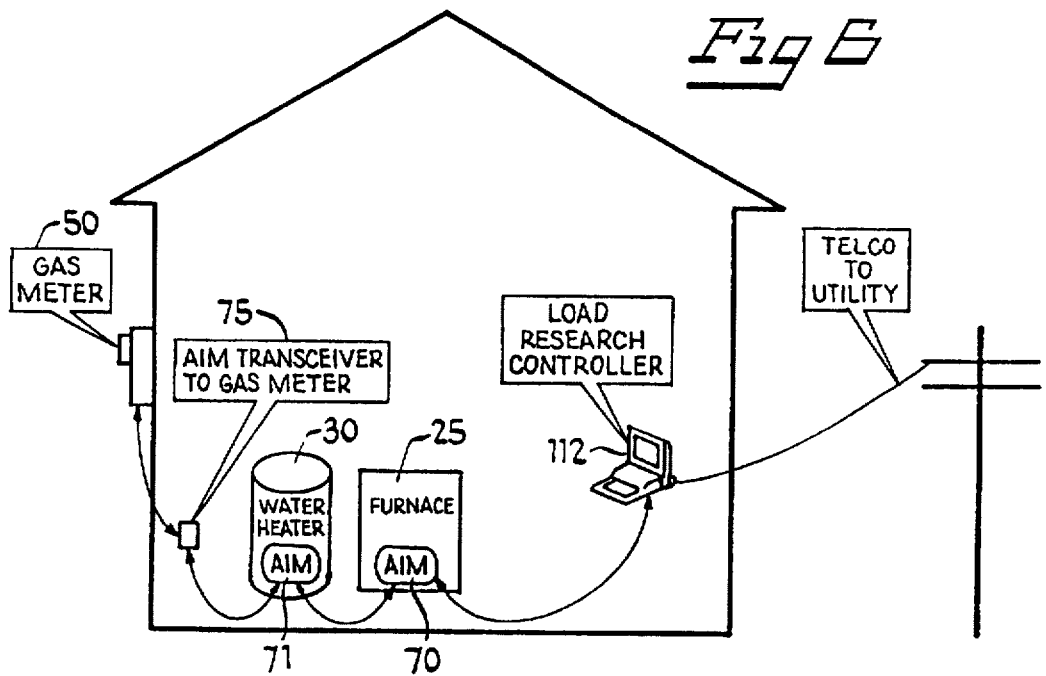
FIG. 6 is a schematic illustration of an alternative configuration for communication between a gas meter, its AIM and a utility.
Figure 7:
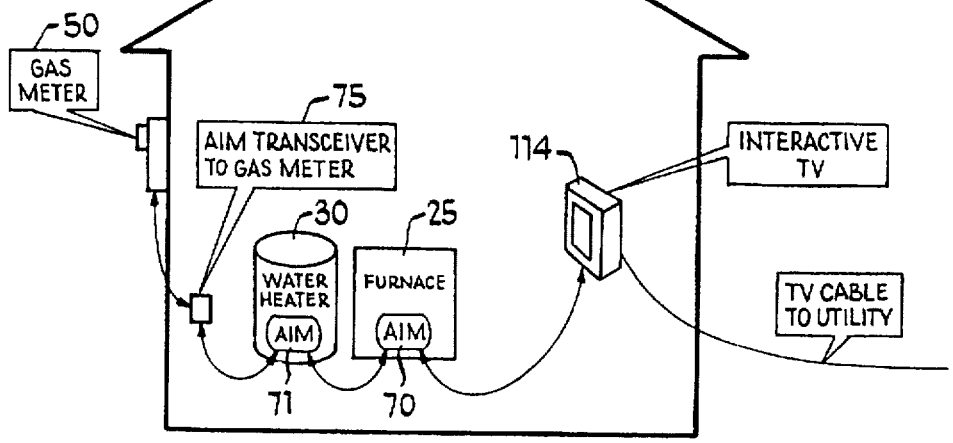
FIG. 7 is a schematic illustration of a further alternative configuration for communication between a gas meter, its AIM and a utility.

FIGS. 5–7 illustrate schematically alternate arrangements for the handling and routing of the information and communications going to and from gas meter 50—although the arrangement would also be applicable for other devices as well. FIG. 5 illustrates a simple configuration, wherein AIM 75 is patched, via modem, into the residence's telephone wiring, or is directly connected to the external telephone utility wires 110. In such an embodiment, the gas utility could directly "call" the AIM 75, and query AIM 75 as to the gas utilization recorded during the current monitoring period. The arrangement of FIG. 5 largely or totally avoids communication through the home automation system.

In FIG. 6, a more complex and potentially interactive arrangement is provided, one which makes use of the home's automation system and communications routing. Gas meter 50, water heater 30 and furnace 25 are connected, via their respective AIMs 75, 71 and 70, through the home's power lines, or other suitable medium (twisted pair, etc.), to controller 15, which, in this specific embodiment, may be a load research controller 112. Controller 112 is connected, via modem, to the "outside" and for example, to the gas utility. The connection through the controller 112 from the utility to furnace 25 and AIM 70, heater 30 and AIM 71, and meter 50 and AIM 75 is intended to be complete so as to permit the transmission of inquiries and/or data to or from the utility to be passed through from or to the appliances at all times. The presence of heater 30 and furnace 25 in the arrangement of FIG. 6 has further relevance as described in further detail hereinafter.

The alternative embodiment of FIG. 7 substitutes the local cable system for the telephone lines, as the communications link to the "outside world" (i.e., utilities, etc.). Instead of displaying messages via PC or a dedicated controller display, the family television 114, being connected to the cable system, can act as the user/home owners interface with the automation system and the utilities, etc. Data coming from AIMs 70, 71, 75 are transferred past television 114, via communication through the house's power line carrier (using CEBus communication or the like). Again, the connection through to the cable system, and ultimately to the utility, will be open at all times, so as to permit inquiry by the utility, at any time, so long as the correct address information is transmitted, so that the correct AIMs will "know" that they are being called. As previously mentioned, each AIM will have a unique separate address, to differentiate it from all other AIMs within a given regional area (which may be defined by blocks, cities, counties, or the like).

As part of the interconnection of residence appliances discussed herein, in order to achieve automation, it may be desirable to modify the direct (and exclusive) communication between the residence's existing thermostats/sensors/ programmable controllers, etc. and the furnace controller, such the communication takes place via the CEBus (or other) communications routes, such as the power line carrier. Once this modification is made, then the nature and substance of the communications between the thermostats/ sensors/programmable controllers, etc. and the furnace controller can be queried and even altered, possibly even from outside the home. For example, an individual having a computer with modem at work would be enabled to alter (or simply override) the thermostat settings at home, so as to change the heating/cooling functions of the home HVAC system 25. In addition, the data acquisition, storage and communication, and diagnostic functions described would also be possible, if desired.

In general, communication between appliances and mechanical systems within a residence is intended, according to the present invention, to be accomplished, where possible, utilizing power line carrier communications, on the existing residence wiring. By using existing wiring wherever possible, the initial cost of installing an automated residence using the AIMs of the present invention is reduced, thereby encouraging adoption of such systems. Where this is not possible, or otherwise not desirable, communication according to a standard like CEBus (or other automation standard) can be done via twisted pair, coaxial cable, or radio frequency communications. Audio/video bus communications and fiber optics communications standards which are currently being developed in the industry, are also contemplated as being used in connection with the present invention. As described herein, incoming communications to the residence can be carried in a number of ways: via telephone lines through a modem-equipped controller or suitably programmed personal computer, via radio frequency (as in the gas meter reading example), through the television cable service connections (if the residence is so equipped), or by combinations of the above.

Connection of an automated residence, according to the present invention, and employing AIMs as described, with "the outside world" via telephone lines, radio frequency and/or through the cable television lines, permits various advantageous cost and effort-saving functions to be possible. For example, if a number of such residences are "connected" in the manner described, each residence and each appliance therein having its own "address" or other suitable unique means of identification, a utility, such as a gas or electric power company, may be able to monitor individual residence usages over large areas. If the AIMs in the residences are suitably programmed and installed, the utility, if permitted or contracted to do so, may even undertake some limited override control of the operation of the appliances and mechanical systems of one or more residences. If the utility were to perceive that a potential power shortage ("brownout") were developing, or that there were a dangerous gas pressure instability occurring, the utility would then be able to communicate with the appliances in the residences, so as to stop or slow down appliances, turn down furnaces, shut off gas flows, etc., as may be desired in order to temporarily reduce the load on the utility, or prevent or alleviate hazardous conditions until the period of potential danger has passed.

An example of the foregoing would be if the utility were to detect a "brownout" situation developing. In an electric heated residence, the utility would communicate to the AIMs on the furnace and give instructions having the effect of disabling the residence thermostat and take over control, by reducing (or raising, as may be appropriate) the setpoints. Monitoring of the operation of such appliances as the furnace would be accomplished by taking data on the return and exit air temperatures, and performing interpolations, according to techniques known in the art, to approximate the residence space temperatures.

A utility would further be in a position to acquire much more accurate and detailed information regarding patterns of power usage, incidences of usage of failing or inefficient equipment and the like, which would assist the utility in planning its own power generation or delivery requirements in the future, as well as educating its consumers regarding the replacement or repair of faulty or antiquated equipment. In those residences in which a television, computer, or display equipped-controller is connected into the automation system, the utility would have the capacity to communicate information to the residence relating to such periods when control would be taken over from outside, or when the residence's gas or electric consumption suggests potential or actual failure conditions or hazardous conditions.

An example of the foregoing might be that the residence's gas consumption data might appear to be significantly inconsistent with the gas usage data which might be acquired from the various appliances, suggesting a leak condition, in the house or nearby. A warning could be posted in the residence, while the information is also simultaneously communicated to such other entities, such as repair crews in the utility, or emergency personnel. More common mundane communication functions might be a detected potential failure or required scheduled replacement of a part, such as "replace air filter" message being flashed on a television set. Of course, this same feature can be accomplished regardless of the utility's involvement. Many different forms of communication functions are contemplated, which may vary according to the level of involvement of the utility or other outside entities, in the operation of the residence which is permitted, the communication and monitoring capabilities of the utility, and the various parameters and priorities which may be determined and agreed to between the residences and the various entities permitted access into the operation of the residences.

Permitting access by such outside entities as utilities can also be cost saving, by reducing the amount of time, labor and effort involved in gathering data (meter reading, usage patterns, etc.) which the utility needs to function on a daily basis, as well as speeding the communication of data regarding potential problem or hazard conditions, permitting faster response time by the utility, as well as other emergency services which can also be tied in (connecting residence fire alarms, smoke and $CO_2$ detectors and security systems into the overall automation of the residence is contemplated as part of the present invention).

FIGS. 8–13 illustrate a possible sequence of programming and operations, for a furnace AIM, as might be employed in one of the furnace configurations of FIG. 2. The steps illustrated can be obtained by the suitable programming of known microprocessor configurations utilizing known programming and manufacturing techniques. Once having the overall invention concepts herein explained, an average technician skilled in the art would understand and be able to implement the steps described therein. While reference is made to a CEBus standard and/or CEBus connections, other automation standards and references are understood also to be within the scope of the present invention.

Figure 8:
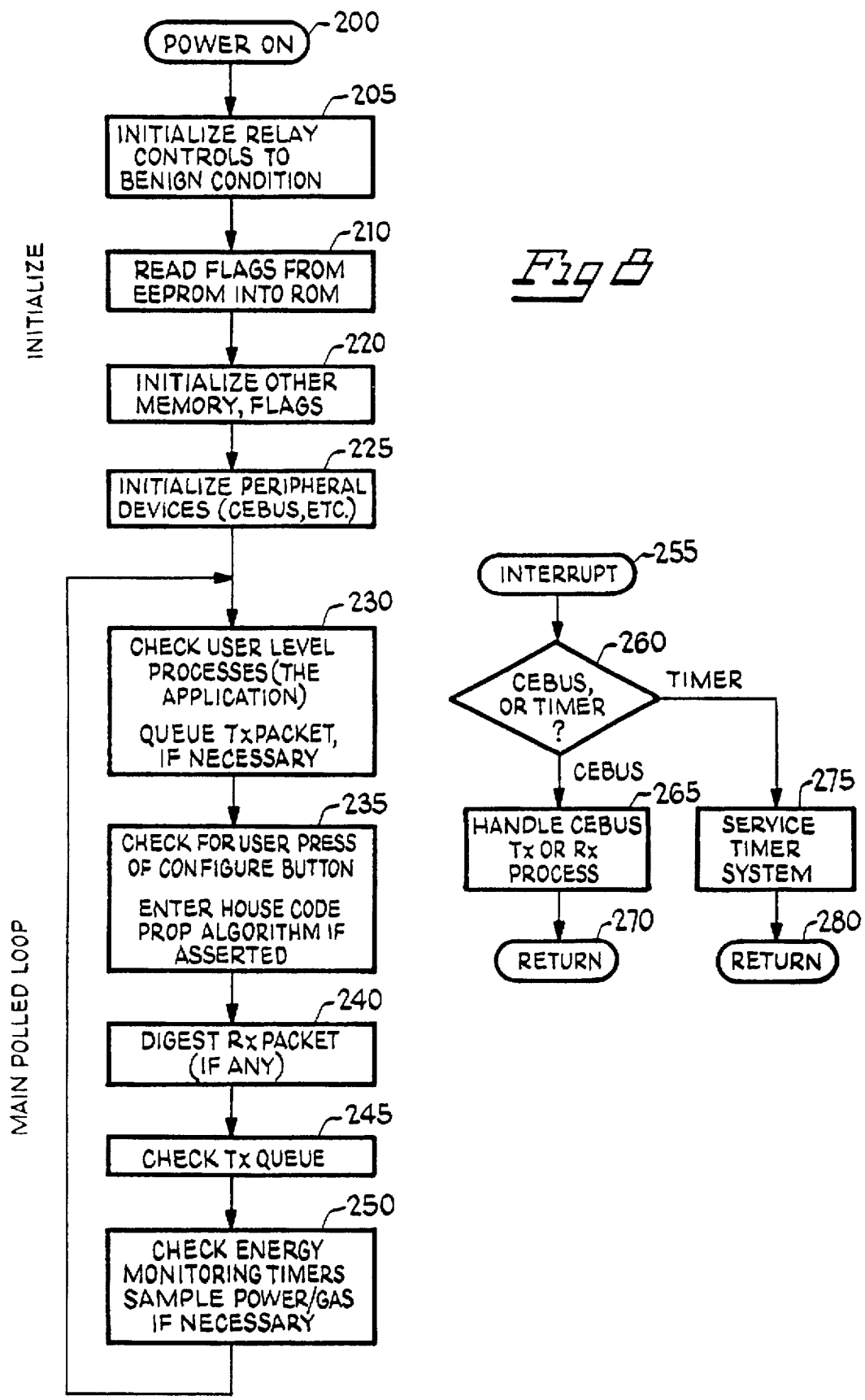
FIG. 8 is a flow chart illustrating the steps for initialization and operation of an AIM attached to a furnace.

FIG. 8 illustrates one possible sequence of initialization and overall software process steps of a furnace AIM. Once the AIM has been powered up, and initialization steps 200–225 have been completed, the user level processes are checked (step 230). FIG. 8 illustrates the procedures for checking user level processes.

At step 305, "zone control=remote?" a yes indicates that the furnace AIM has received an incoming transmission instructing it to override the home thermostat, and proceed to control temperature using the thermostat bypass procedure described hereinabove. At step 310, a "no" response means that no specific heat request is pending, and the temperature monitoring processes in the furnace should be checked (step 325 of FIG. 9, further illustrated as steps 700–735 of FIG. 13). The AIM instructs the furnace to run the fan only, for such predetermined time that the temperature sensors in the furnace can provide adequate data to permit the room temperature to be approximated. A "yes" response means that the heat control processes should be checked (step 315 of FIG. 9, further illustrated as steps 400–480 of FIG. 10). Generally stated, steps 400–480 enable the AIM to determine when heating is needed, causes the furnace to provide heat, continues heating until the circulation fan activates, and monitors temperature rise in the return and exit furnace air flows.

Figure 10:
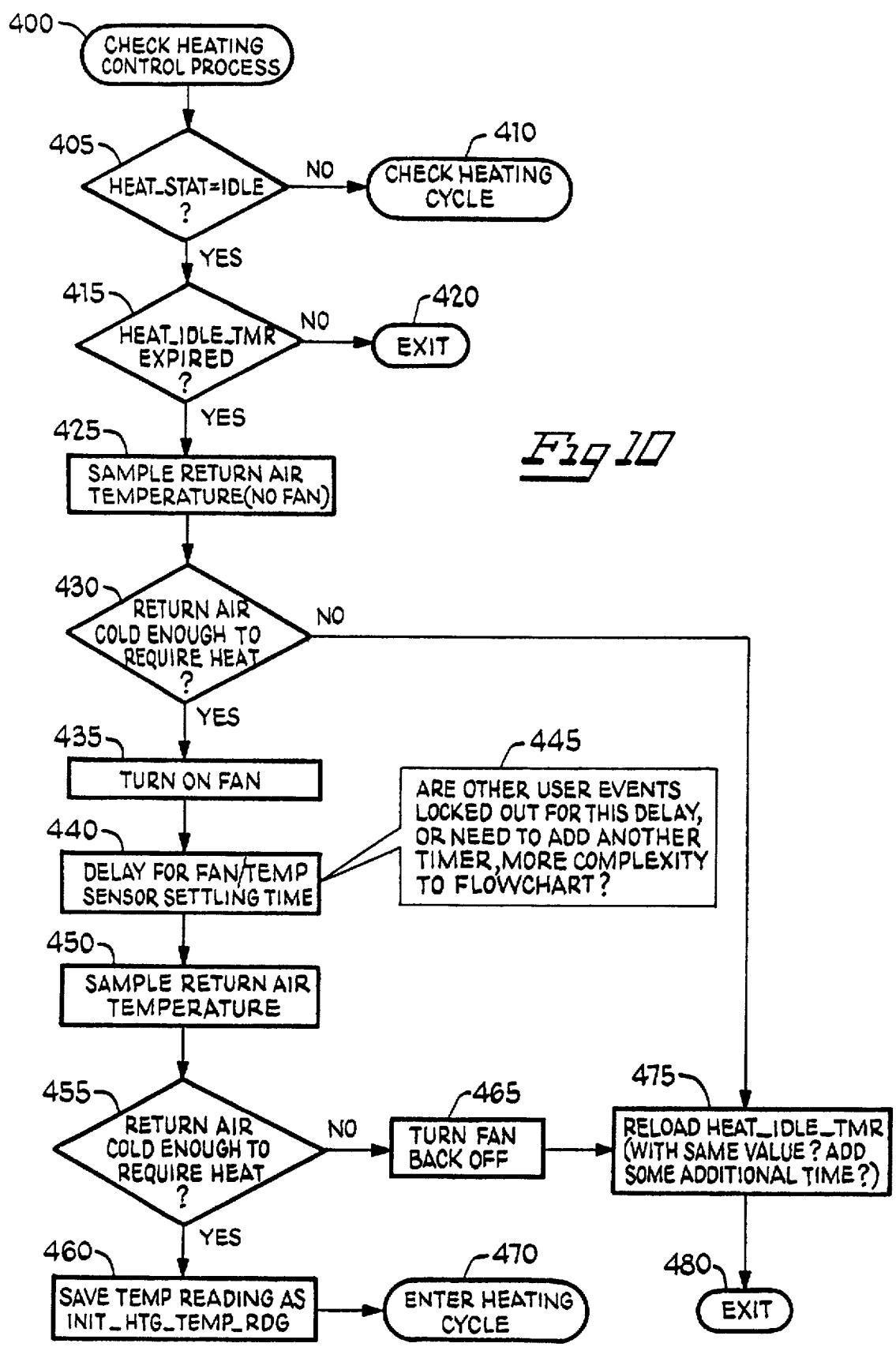
FIG. 10 is an expanded flow chart illustrating the steps of checking heating control processes, from step 315 of FIG. 9.
Figure 11:
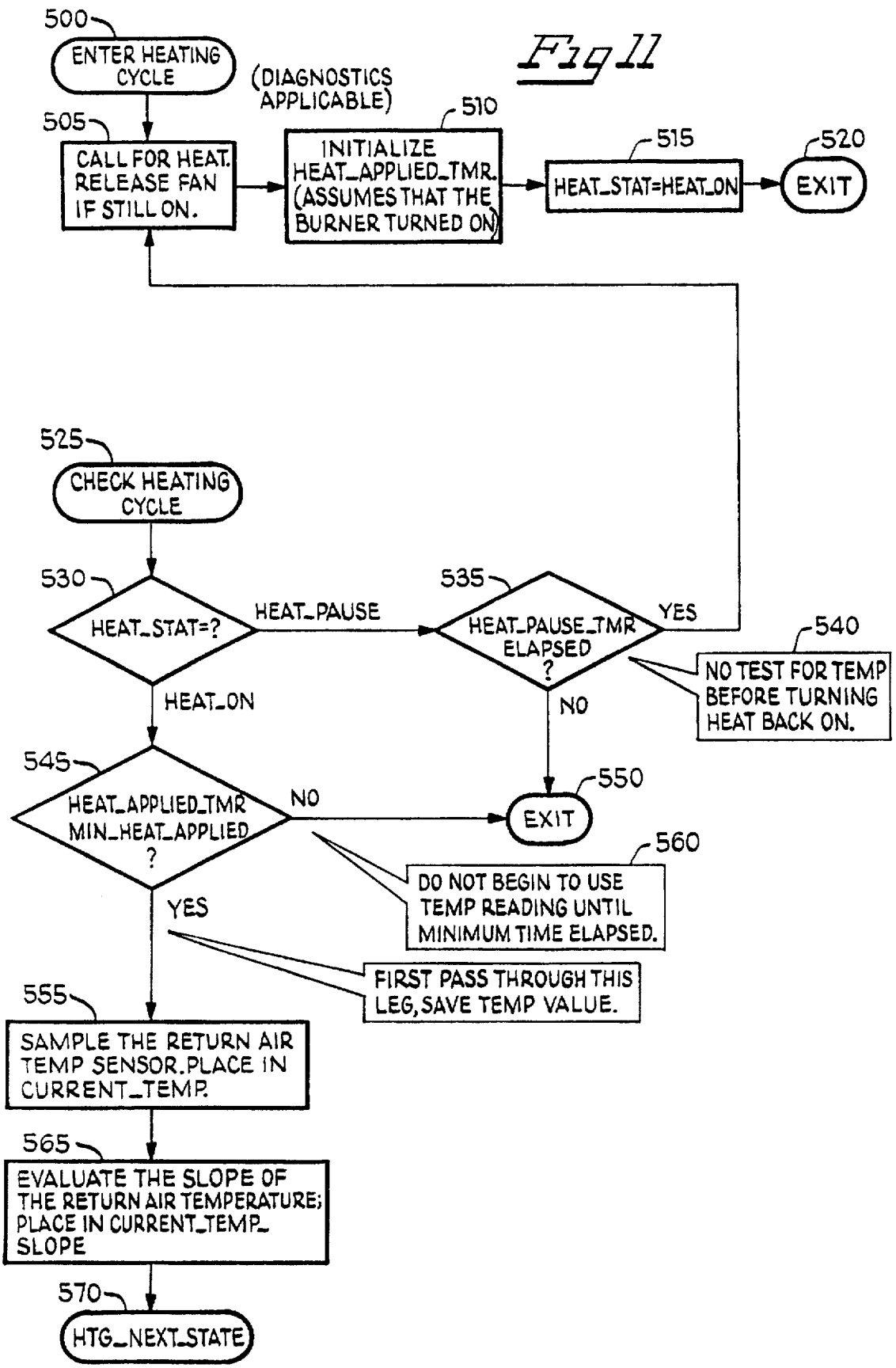
FIG. 11 is an expanded flow chart illustrating the steps of entering and checking the heating cycle, initialization and maintenance, from step 470 of FIG. 10.
Figure 13:
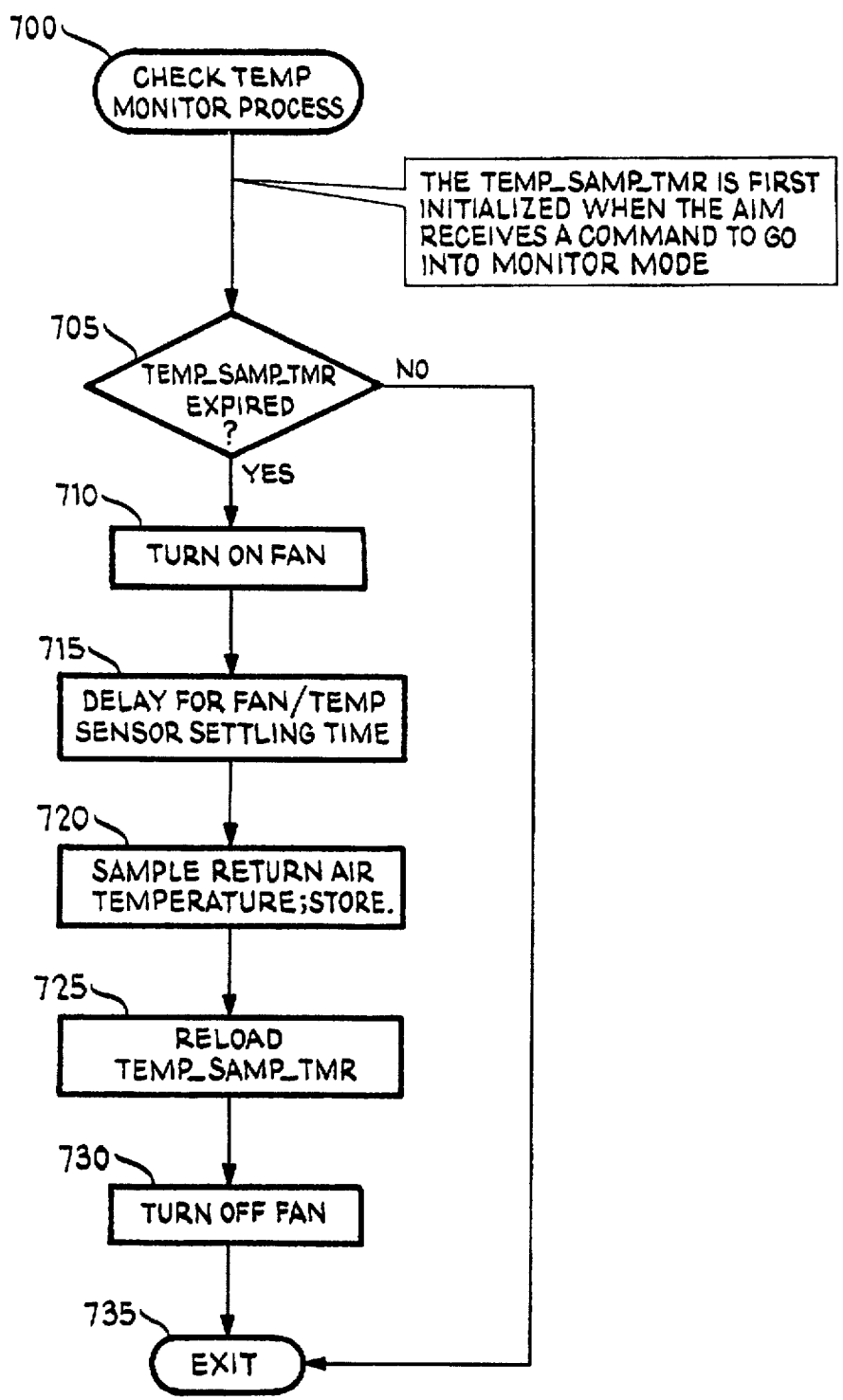
FIG. 13 is an expanded flow chart illustrating the steps of checking the temperature monitoring process, from step 325 of FIG. 9.

The step 410 of FIG. 10 (check heating cycle) and 470 (enter heating cycle), are further illustrated as steps 500–570 of FIG. 11, and steps 600–650 of FIG. 12 (from step 570 of FIG. 11). The AIM may then calculate the projected temperature rate of change (see FIG. 14), so as to estimate the appropriate time to cut off heat, so as to avoid overheating. It is believed that in many applications, the temperature change inertia of the thermal mass within the home will be sufficient to prevent temperature overshoot during thermostat override heating, so as to result in a simplified implementation.

Figure 14:
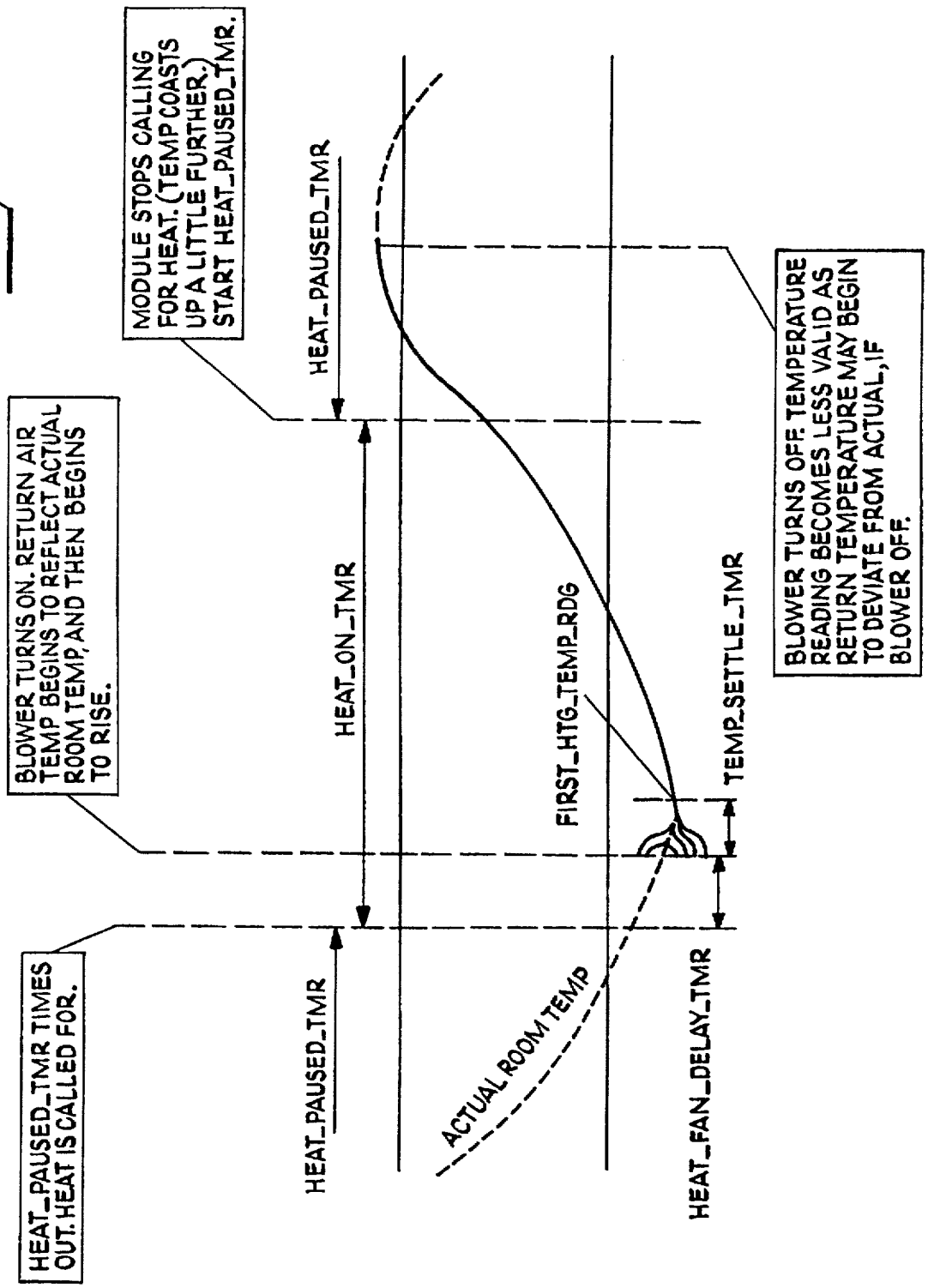
FIG. 14 is a plotting of temperature fluctuations during an AIM governed heating cycle, depicting heating cycle time periods named in FIGS. 10–13.

FIG. 14 illustrates the temperature variations in a space, and the steps in a heating cycle, during AIM controlled heating.

The appropriate, temperature inverted, steps for thermostat override procedures during cooling periods, can be readily appreciated and arrived at by technicians of average skill in the art, upon review of the foregoing steps.

The furnace AIM may, as previously described, have learning functions. For example, the programming or other operation of the residence's "regular" thermostat can be observed, in terms of actual temperature settings, and setback times. Then, when an outside instruction is received, in the form of, for example, "reduce temperature 5 degrees", the AIM will then know what the target temperature is to be. The AIM may also learn the relationship between actual sensed room temperature versus sensed return air temperature, which will vary from house to house and room to room, depending upon such factors as the locations of the room sensors, location of air inlet and return air grills, etc. The AIM may also be provided with certain shortcut procedures, such as recognizing/remembering when a fan has been recently run, to enable the AIM to get an accurate reading of room temperature, this calibration step need not be performed each time a temperature status is required by one of the detailed procedures. The AIM may be instructed to poll the return air sensor and if the reading has changed less than a certain value, during a preselected time period, then the AIM "assumes" that room temperature likewise has not changed, and running the fan to get a read on room temperature is not required.

Other AIMs may also be suitably programmed to have analogous learning functions.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

We claim:

1. An HVAC system capable of continued operation following a thermostat malfunction, the HVAC system comprising:

a thermostat having an output signal indicative of air temperature of a conditioned space proximate the thermostat;

an HVAC unit having a heat exchanger, a blower for drawing air through the heat exchanger, and at least one of a heating unit and a cooling unit for modifying the temperature of air circulating through the heat exchanger;

a discharge air plenum coupling the HVAC unit to the conditioned space, the discharge air plenum providing a path for air discharged from the HVAC unit to be expelled into the conditioned space;

a return air plenum coupling the conditioned space to the HVAC unit, the return air plenum providing a path for return air from the conditioned space to an inlet port of the HVAC unit;

a temperature sensor having an output signal indicative of return air temperature;

an HVAC controller coupled to the thermostat, the temperature sensor, and the HVAC unit;

means within the HVAC controller for sensing the output signal of the thermostat and for modifying air temperature within the conditioned space based upon the output signal of the thermostat;

means within the HVAC controller for detecting a malfunction of the thermostat; and means within the HVAC controller for sensing the output of the temperature sensor and for modifying air temperature within the conditioned space based upon the output signal of temperature sensor, in response to detecting a malfunction of the thermostat.

2. The HVAC system according to claim 1 further including at least one positionable air damper associated with at least the discharge air plenum.

3. The HVAC system according to claim 2 further including means to position at least one of the positionable air damper in an open orientation upon detection of a malfunction of the thermostat.

* * * * *